United States Patent
Duan et al.

(10) Patent No.: US 12,054,436 B2
(45) Date of Patent: Aug. 6, 2024

(54) DOUBLE-NEGATIVE-INDEX CERAMIC AEROGELS FOR THERMAL SUPERINSULATION

(71) Applicant: THE REGENTS OF THE UNIVERSITY OF CALIFORNIA, Oakland, CA (US)

(72) Inventors: Xiangfeng Duan, Los Angeles, CA (US); Yu Huang, Los Angeles, CA (US); Xiang Xu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 424 days.

(21) Appl. No.: 17/427,277

(22) PCT Filed: Jan. 23, 2020

(86) PCT No.: PCT/US2020/014843
§ 371 (c)(1),
(2) Date: Jul. 30, 2021

(87) PCT Pub. No.: WO2020/167442
PCT Pub. Date: Aug. 20, 2020

(65) Prior Publication Data
US 2022/0144714 A1    May 12, 2022

Related U.S. Application Data

(60) Provisional application No. 62/799,862, filed on Feb. 1, 2019.

(51) Int. Cl.
*C04B 38/06* (2006.01)
*C04B 35/14* (2006.01)
(Continued)

(52) U.S. Cl.
CPC .......... *C04B 38/0615* (2013.01); *C04B 35/14* (2013.01); *C04B 35/583* (2013.01);
(Continued)

(58) Field of Classification Search
CPC ........ G02B 1/002; G02B 1/005; G02B 1/007; C04B 35/00–35/83; C04B 38/00–38106
See application file for complete search history.

(56) References Cited

U.S. PATENT DOCUMENTS

| | | |
|---|---|---|
| 2004/0033882 A1 | 2/2004 | Barney et al. |
| 2010/0179288 A1 | 7/2010 | Leventis et al. |
| 2018/0245205 A1* | 8/2018 | Salomon ................ B82B 3/008 |

FOREIGN PATENT DOCUMENTS

| | | | |
|---|---|---|---|
| CN | 109704781 | 5/2019 | |
| WO | WO-2016200947 A1 * | 12/2016 | ............ B81C 3/001 |

OTHER PUBLICATIONS

Zhang et al. "Flyweight, Superelastic, Electrically Conductive, and Flame-Retardant 3D Multi-Nanolayer Graphene/Ceramic Metamaterial", Advanced Materials, 29, 1605506, (2017); pp. 1-12.*
(Continued)

*Primary Examiner* — Prashant J Khatri
(74) *Attorney, Agent, or Firm* — Foley & Lardner LLP

(57) ABSTRACT

A ceramic aerogel includes a porous framework including interconnected double-paned wall structures of a ceramic material, wherein each double-paned wall structure includes a pair of walls spaced apart by a gap.

25 Claims, 33 Drawing Sheets

(51) Int. Cl.
*C04B 35/583* (2006.01)
*C04B 35/628* (2006.01)
*C04B 35/80* (2006.01)
*C04B 38/00* (2006.01)
*E04B 1/74* (2006.01)
*E04B 1/76* (2006.01)

(52) U.S. Cl.
CPC ........ *C04B 35/62884* (2013.01); *C04B 35/80* (2013.01); *C04B 38/00* (2013.01); *C04B 38/0067* (2013.01); *C04B 38/0074* (2013.01); C04B 2235/3418 (2013.01); C04B 2235/3834 (2013.01); C04B 2235/386 (2013.01); C04B 2235/614 (2013.01); C04B 2235/767 (2013.01); C04B 2235/9607 (2013.01); C04B 2235/963 (2013.01); *E04B 2001/742* (2013.01); *E04B 1/76* (2013.01)

(56) References Cited

OTHER PUBLICATIONS

Song et al. "Ultralight boron nitride aerogels via template-assisted chemical vapor deposition", Sci Rep 5, 10337 (2015); pp. 1-9.*
Loehman, R. "Ceramics, Overview", Kirk-Othmer Encyclopedia of Chemical Technology, (2000); pp. 1-4.*
Xu et al. "Double-negative-index ceramic aerogels for thermal superinsulation", Science, 363, (2019); pp. 723-727.*
Meza et al. "Strong, lightweight, and recoverable three-dimensional ceramic nanolattices", Science, vol. 345, Issue 6202, (2014); pp. 1322-1326.*
Xie et al. "Carbon aerogels towards new candidates for double negative metamaterials of low density", Carbon, 129, (2017); pp. 598-606.*
Xu et al. "Naturally Dried Graphene Aerogels with Superelasticity and Tunable Poisson's Ratio", Advanced Materials, 28, (2016); pp. 9223-9230.*
Barrios et al., "Nanomaterials in Advanced, High-Performance Aerogel Composites: A Review," (2019) Polymers, vol. 11, Article 726, pp. 1-41.
Foreign Action other than Search Report on PCT PCT/US2020/014843 Dtd Aug. 12, 2021.
Foreign Search Report on PCT PCT/US2020/014843 Dtd Jul. 22, 2020.
George et al., 2D Mater. 4, 032001 (2017).
Li, J. et al. (2013) "Porous Boron Nitride with a High Surface Area: Hydrogen Storage and Water Treatment," Nanotechnology, 24:155603.
Rousseas, M. et al. (2013), "Synthesis of Highly Crystalline sp2-Bonded Boron Nitride Aerogels", American Chemistry Society, 7(10):8540-8546.
Shi et al., Mater. Sci. Engin. A 585, 25 (2013).
Si et al., Nat. Commun. 5, 5802 (2014).
Si et al., Sci. Adv. 4, (2018).
Song et al., Sci. Rep. 5, 10337 (2015).
Su et al., ACS Nano 12, 3103 (2018).
Wang et al., Sci. Adv. 3, (2017).
Xie et al., Carbon 98, 381 (2016).
Yin, J. et al. (2013) "Ultralight Three-Dimensional Boron Nitride Foam with Ultralow Permittivity and Super-elasticity," Nano Lett., 13:3232-3236.
Zeng et al., Chem. Mater. 27, 5849 (2015).
Zhang et al., ACS Appl. Mater. Inter. 9, 14232 (2017).
Zu et al., Chem. Mater. 25, 4757 (2013).

* cited by examiner

DOUBLE-NEGATIVE-INDEX CERAMIC AEROGELS FOR THERMAL SUPERINSULATION

CROSS-REFERENCE TO RELATED APPLICATIONS

This application is a National Stage Entry of International Application No. PCT/US2020/014843, filed Jan. 23, 2020, which claims the benefit of U.S. Provisional Application No. 62/799,862, filed Feb. 1, 2019, the contents of which are incorporated herein by reference in their entirety.

STATEMENT REGARDING FEDERALLY SPONSORED RESEARCH OR DEVELOPMENT

This invention was made with government support under Grant Numbers DMR1508144 and EFRI1433541, awarded by the National Science Foundation. The government has certain rights in the invention.

TECHNICAL FIELD

This disclosure generally relates to a ceramic aerogel.

BACKGROUND

Ceramic aerogels are attractive for thermal insulation because of their low density, low thermal conductivity, and excellent fire/corrosion resistances. However, due to their brittle nature and crystallization induced pulverization behavior, ceramic aerogels often suffer from strength degradation and structural collapse under large thermal gradients or extended high-temperature exposure.

It is against this background that a need arose to develop the embodiments described herein.

SUMMARY

Some embodiments are directed to the design of a double-paned walled ceramic meta-structure with negative Poisson's ratio (NPR) and negative thermal expansion coefficient (NTEC) to endow exceptional mechanical and thermal stability for superinsulation under extreme conditions. In some embodiments, by using three-dimensional (3D) graphene aerogels as templates, synthesis is made of 3D ceramic meta-materials (including, hexagonal boron nitride aerogels (hBNAs) and β silicon carbide aerogels (βSiCAs)) with NPR and NTEC to greatly enhance their mechanical and thermal stabilities, and with double-paned pore walls to ensure ultralow thermal conductivity. In some embodiments, a graphene aerogel templated and catalytic-free chemical vapor deposition (CVD) method is used to form the ceramic aerogels. The resulting hBNAs exhibit ultralow density (e.g., about 0.1 mg/cm$^3$), superelasticity (e.g., up to about 95%), thermal superinsulation (e.g., about 2.4 mW/m K in vacuum and about 20 mW/m K in air), and exceptional thermal stability under sharp thermal shocks (e.g., about 275° C./s) and long-term high temperature exposures (e.g., about 900° C. in air and about 1,400° C. in vacuum), which are beyond the reach of other ceramic aerogels, providing a robust material for thermal superinsulation in extreme environments. It provides a path towards practical thermal insulation with excellent fire/corrosion resistances and robust thermomechanical properties.

Moreover, some embodiments are directed to the design of one-dimensional (1D) fibrous and two-dimensional (2D) nanosheet hybrid meta-structures for ceramic aerogels with ultra-flexibility, super lightweight and super thermal insulation properties by template assisted and catalyst-free CVD method. The fibrous structure strongly enhances the bending and torsion flexibility with superelasticity of compression, which exhibits a high deformability and high thermal stability for the resulting ceramic aerogels. The fibrous/film hybrid meta-structure ceramic aerogels exhibit ultrahigh flexibility, superelasticity (e.g., about 99%), ultralight weight (<about 10 mg/cm$^3$), excellent thermal stability and super thermal insulating (<about 24 mW/m K), which also provide a material system for thermal superinsulation in extreme environments.

In some embodiments, a ceramic aerogel includes a porous framework including interconnected double-paned wall structures of a ceramic material, wherein each double-paned wall structure includes a pair of walls spaced apart by a gap.

In some embodiments, a method of forming a ceramic aerogel includes: (1) providing a template, wherein the template is an aerogel of a template material; (2) depositing a ceramic material on and within the template; and (3) removing the template material to form the ceramic aerogel.

In some embodiments, a ceramic aerogel includes a fibrous framework and interconnected nanosheets of a ceramic material covering the fibrous framework.

In some embodiments, a method of forming a ceramic aerogel includes: (1) providing a template, wherein the template is a fibrous framework; and (2) depositing a ceramic material on and within the template to form interconnected nanosheets of the ceramic material covering the fibrous framework.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 47:
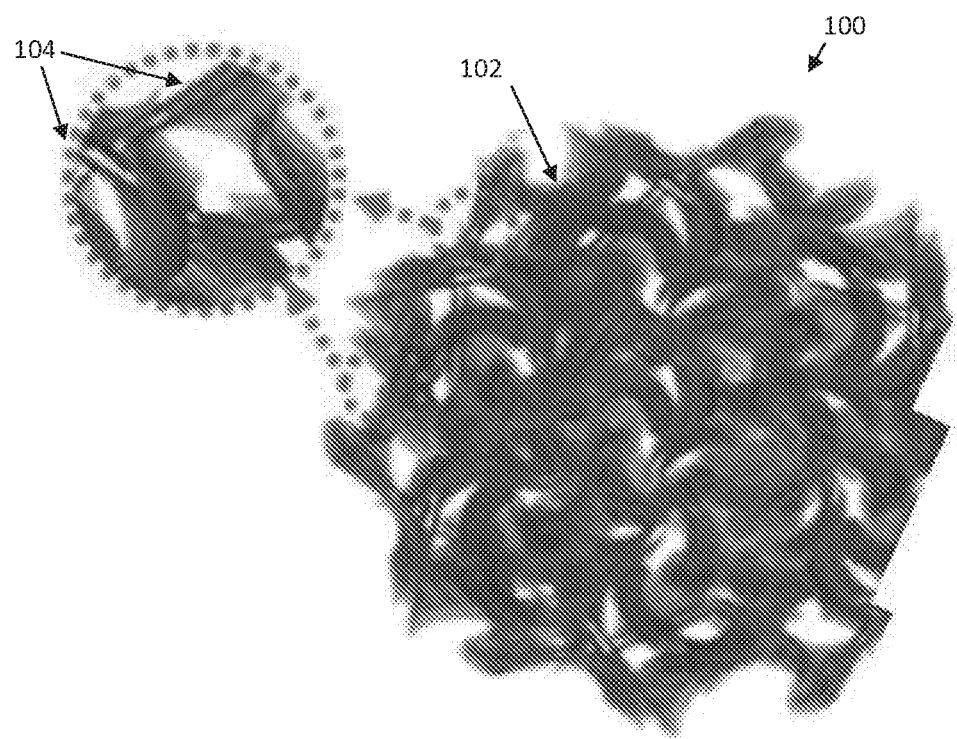
FIG. 47 illustrates a ceramic aerogel according to some embodiments.

FIG. 47 illustrates a ceramic aerogel 100 according to some embodiments. As illustrated, the ceramic aerogel 100 includes a porous framework 102 including interconnected double-paned wall structures 104 of a ceramic material, wherein each double-paned wall structure 104 includes a pair of walls spaced apart by a gap.

In some embodiments of the ceramic aerogel 100, the porous framework 102 is hyperbolic structured.

In some embodiments of the ceramic aerogel 100, the interconnected double-paned wall structures 104 define pores within the porous framework 102.

In some embodiments of the ceramic aerogel 100, the ceramic material is a metal, non-metal, or metalloid nitride. In some embodiments, the ceramic material is hexagonal boron nitride.

In some embodiments of the ceramic aerogel 100, the ceramic material is a metal, non-metal, or metalloid carbide. In some embodiments, the ceramic material is β silicon carbide.

In some embodiments of the ceramic aerogel 100, the ceramic material is a metal, non-metal, or metalloid oxide.

In some embodiments of the ceramic aerogel 100, the ceramic material is a metal, non-metal, or metalloid silicate.

In some embodiments of the ceramic aerogel 100, the gap between the pair of walls is in a range of about 1 nm or greater, such as about 1 nm to about 50 nm, about 1 nm to about 40 nm, about 1 nm to about 30 nm, about 1 nm to about 20 nm, or about 1 nm to about 10 nm.

In some embodiments of the ceramic aerogel 100, each of the pair of walls has a thickness in a range of about 1 nm or greater, such as about 1 nm to about 150 nm, about 1 nm to about 100 nm, about 1 nm to about 80 nm, about 1 nm to about 60 nm, about 1 nm to about 40 nm, about 1 nm to about 30 nm, about 1 nm to about 20 nm, or about 1 nm to about 10 nm.

In some embodiments of the ceramic aerogel 100, each of the pair of walls includes one or more (e.g., 2 or more, 3 or more, 4 or more, 5 or more) layers (e.g., monolayers) of the ceramic material.

In some embodiments of the ceramic aerogel 100, the ceramic aerogel 100 has a negative Poisson's ratio. In some embodiments, the Poisson's ratio is about −0.05 or less, about −0.1 or less, about −0.15 or less, about −0.2 or less, or about −0.25 or less, and down to about −0.3 or less.

In some embodiments of the ceramic aerogel 100, the ceramic aerogel 100 has a negative linear thermal expansion coefficient. In some embodiments, the linear thermal expansion coefficient is about $-1\cdot10^{-8}$/° C. or less, $-5\cdot10^{-8}$/° C. or less, $-1\cdot10^{-7}$/° C. or less, $-5\cdot10^{-7}$/° C. or less, $-1\cdot10^{-6}$/° C. or less, or $-5\cdot10^{-6}$/° C. or less, and down to about $-1\cdot10^{-5}$/° C. or less.

In some embodiments of the ceramic aerogel 100, the ceramic aerogel 100 has a density of about 50 mg/cm$^3$ or less, about 40 mg/cm$^3$ or less, about 30 mg/cm$^3$ or less, about 20 mg/cm$^3$ or less, about 10 mg/cm$^3$ or less, about 8 mg/cm$^3$ or less, about 5 mg/cm$^3$ or less, about 2 mg/cm$^3$ or less, or about 1 mg/cm$^3$ or less, and down to about 0.1 mg/cm$^3$ or less.

In some embodiments of the ceramic aerogel 100, the ceramic aerogel 100 has a maximum elastic strain of about 50% or greater, about 60% or greater, about 70% or greater, about 80% or greater, about 90% or greater, or about 95% or greater, and up to about 98% or greater.

In some embodiments of the ceramic aerogel 100, the ceramic aerogel 100 has a porosity (in terms of volume percentage accounted by pores) of about 70% or greater, about 80% or greater, about 90% or greater, about 95% or greater, about 98% or greater, or about 99% or greater, and up to about 99.9% or greater, or up to about 99.99% or greater.

In some embodiments of the ceramic aerogel 100, the ceramic aerogel 100 has a specific surface area of about 800 m$^2$/g or greater, about 850 m$^2$/g or greater, about 900 m$^2$/g or greater, about 950 m$^2$/g or greater, about 1000 m$^2$/g or greater, or about 1050 m$^2$/g or greater, and up to about 1100 m$^2$/g or greater, or up to about 1200 m$^2$/g or greater.

In some embodiments of the ceramic aerogel 100, the ceramic aerogel 100 has a thermal conductivity in vacuum of about 15 mW/m K or less, about 13 mW/m K or less, about 10 mW/m K or less, about 8 mW/m K or less, about 5 mW/m K or less, or about 3 mW/m K or less, and down to about 2 mW/m K or less.

In some embodiments of the ceramic aerogel 100, the ceramic aerogel 100 has a thermal conductivity in air of about 50 mW/m K or less, about 45 mW/m K or less, about 40 mW/m K or less, about 35 mW/m K or less, about 30 mW/m K or less, or about 25 mW/m K or less, and down to about 20 mW/m K or less.

In some embodiments, a method of forming a ceramic aerogel includes: (1) providing a template, wherein the template is an aerogel of a template material; (2) depositing a ceramic material on and within the template; and (3) removing the template material to form the ceramic aerogel.

In some embodiments of the method, the template material is a carbonaceous material. In some embodiments, the template material is graphene.

In some embodiments of the method, depositing the ceramic material is performed by chemical vapor deposition. In some embodiments, depositing the ceramic material further includes heating to induce crystallization of the ceramic material.

In some embodiments of the method, removing the template material is performed by heating.

Figure 48:
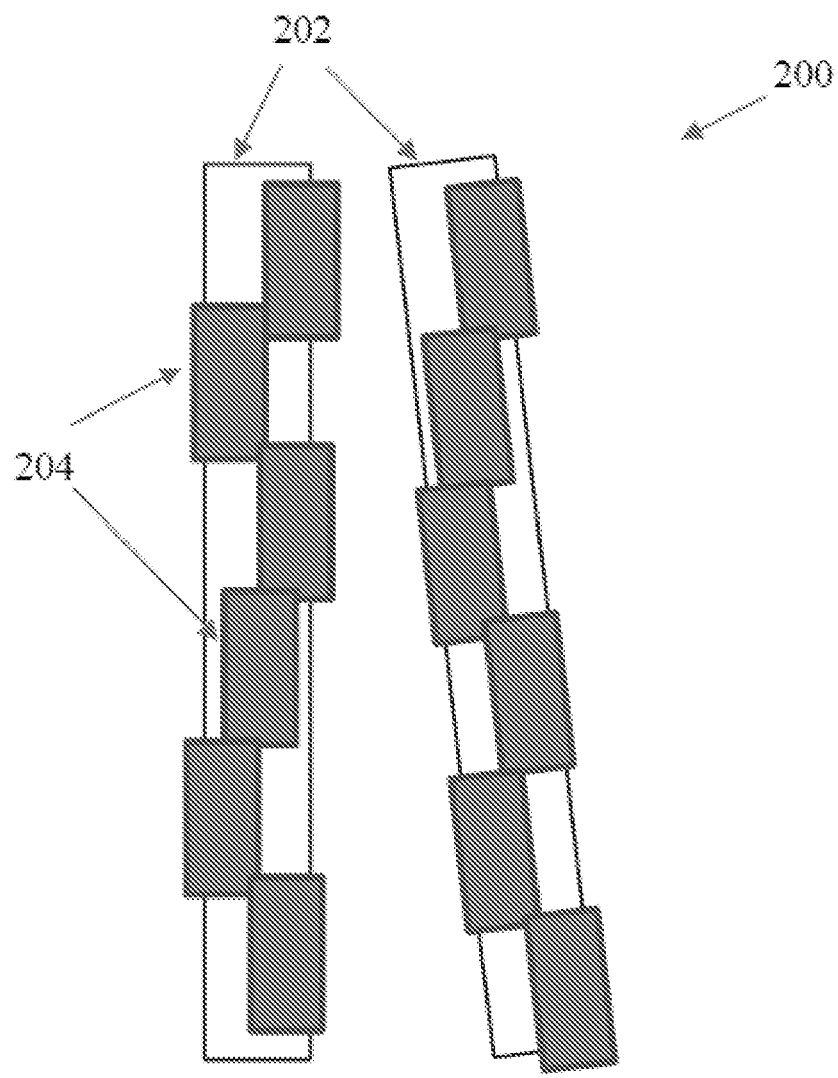
FIG. 48 illustrates a ceramic aerogel according to some embodiments.

FIG. 48 illustrates a ceramic aerogel 200 according to some embodiments. As illustrated, the ceramic aerogel 200 includes a fibrous framework 202 and interconnected nanostructures 204 (e.g., nanosheets) of a ceramic material covering the fibrous framework 202.

In some embodiments, a method of forming a ceramic aerogel includes: (1) providing a template, wherein the template is a fibrous framework; and (2) depositing a ceramic material on and within the template to form interconnected nanostructures (e.g., nanosheets) of the ceramic material covering the fibrous framework.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Overview:

Ceramic aerogels are attractive for thermal insulation but plagued by poor mechanical stability and degradation under thermal shock. Here this example sets forth the design and synthesis of hyperbolic architectured ceramic aerogels with nanolayered double-paned walls with a negative Poisson's ratio (about −0.25) and a negative linear thermal expansion coefficient (about $-1.8\cdot10^{-6}$/° C.). The aerogels display exceptional mechanical and thermal stability, and feature ultralow densities down to about 0.1 mg/cm$^3$, superelasticity up to about 95%, and near-zero strength loss after sharp thermal shocks (about 275° C./s) or intense thermal stress at about 1400° C., as well as ultralow thermal conductivity in vacuum (about 2.4 mW/m K) and in air (about 20 mW/m K). This robust material system is desired for thermal superinsulation under extreme conditions such as spacecraft.

Introduction:

Thermal insulation under extreme conditions, such as rapid temperature changes and long-term high temperature exposure in aerospace and thermal power fields, specifies exceptional stability and reliability for personal and property protection. A prerequisite for the design of thermal insulating materials is thermal stability in relevant working environments. Ceramic aerogels are attractive for thermal insulation for their low density, low thermal conductivity, and excellent fire/corrosion resistances. However, due to their brittle nature and crystallization induced pulverization behavior, ceramic aerogels often suffer from serious strength degradation and structural collapse under large thermal gradients or extended high-temperature exposure. Examples of degradation that may result in catastrophic failure include structure cracks in silica aerogels, strength degradation for silicon carbide (SiC) aerogels and volume shrinkage for alumina aerogels. Therefore, robust mechanical and thermal stability represents the key roadblocks to using ceramic aerogels for reliable thermal insulation under extreme conditions.

Other efforts to improve thermal stability primarily focused on overcoming brittleness by making flexible amorphous one-dimensional (1D) fibrous structures. Fiber-reinforced $SiO_2$ aerogels, $SiO_2$ nanofibrous aerogels, SiC nanowire aerogels, alumina nanolattices, oxide ceramic ($TiO_2$, $ZrO_2$, and $BaTiO_3$) nanofiber sponges, and BN fibrous aerogels are developed with large, recoverable deformability (up to about 80% compressive strain) derived from the elastic fibrous structures. However, due to the large thermal expansion and pulverization behaviors of these ceramic materials, and the weak point-linking pattern between 1D fibers, such fibrous ceramic aerogels still suffer from structural degradation under rapid thermal shocks or high temperatures. Moreover, the 1D fibrous building blocks lead to interconnected macro-scale pores that do not effectively mitigate solid conduction or convection in air. As a result, the thermal conductivities of fibrous ceramic aerogels are typically higher than that of stationary air (about 24 mW/m K).

In contrast, aerogels constructed from two-dimensional (2D) nanosheets, such as graphene aerogels, feature durable face-to-face stacking interactions between 2D nanosheets to endow ultra-large deformability with up to about 99% compression strain. Additionally, the face-to-face stacking between the 2D sheets also partitions the three-dimensional (3D) aerogels into nearly isolated cells to effectively reduce air conduction and convection, producing ultralow thermal conductivities below stationary air. However, due to their ready oxidation and flammability, graphene aerogels are generally not stable in air at high temperature (>about 500° C.). Porous ceramic structures synthesized by direct chemical reaction, elemental substitution and template-assisted methods have attracted considerable interest, including template-assisted methods that produce 3D frameworks to replicate the template architecture. However, volume shrinkage and strength degradation of the resulting ceramic aerogels remain problematic, which may be attributed to poor cross-linking between ceramic blocks and constrained deformability of the typical templates.

Materials with negative-index properties derived from specifically designed structures can substantially enhance performance metrics and allow for the development of desirable attributes. Mechanical metamaterials with negative Poisson's ratio have attracted considerable attention for their unusual mechanical enhancement for diverse applications, particularly in stringent environments such as aerospace and defense areas. By rationally manipulating the structure, materials with negative Poisson's ratio can deliver superior deformability and fracture toughness for overcoming the brittle nature of ceramics aerogels. Simultaneously engineering other negative indexes may synergistically enhance other physical properties like thermal stability.

Results and Discussion:

Here this example reports a design of a ceramic material with exceptional mechanical and thermal stability under extreme conditions. The ceramic has a double-paned meta-structure with negative Poisson's ratio (NPR) and negative thermal expansion coefficient (NTEC). Use is made of specially designed 3D graphene aerogel templates for synthesizing hexagonal boron nitride aerogels (hBNAGs) and β silicon carbide aerogels (βSiCAGs) with excellent thermal and mechanical stabilities. The resulting hBNAGs exhibited ultralow density (about 0.1 mg/cm³), superelasticity (up to about 95%), thermal superinsulation (about 2.4 mW/m K in vacuum and about 20 mW/m K in air), and exceptional thermal stability under sharp thermal shocks (about 275° C./s) and long-term high temperature exposures (about 900° C. in air and about 1,400° C. in vacuum).

Figure 1:
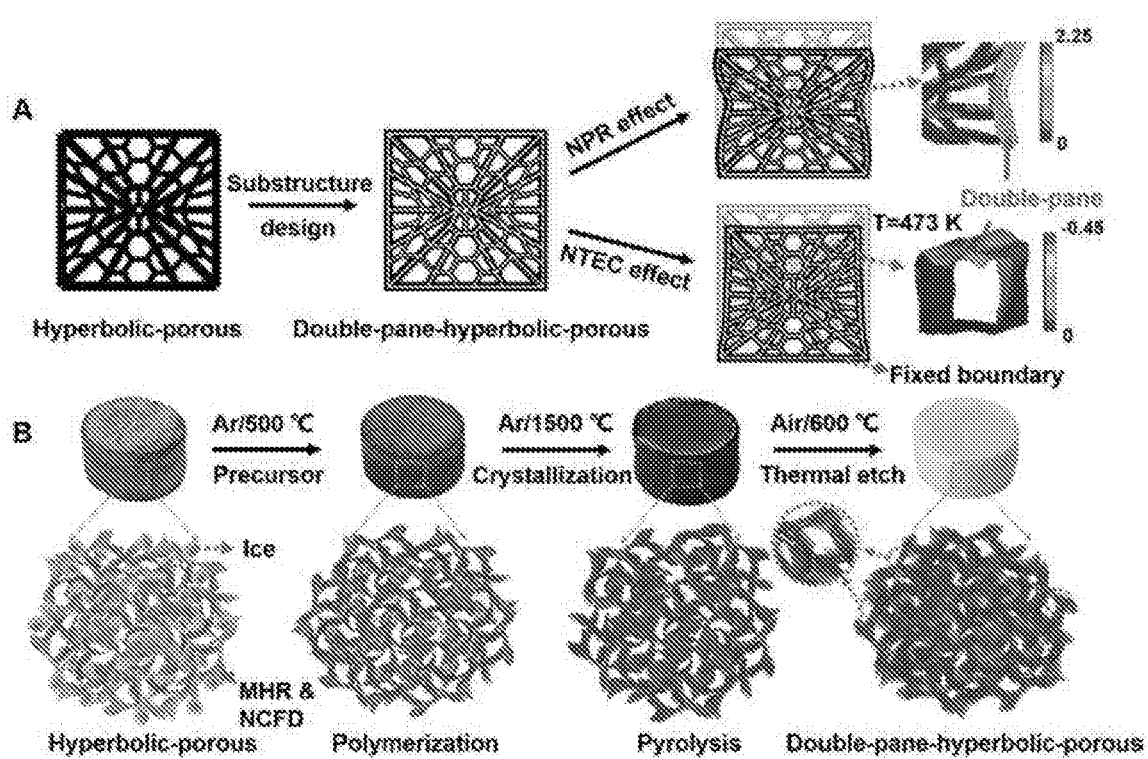
FIG. 1. Structure design and fabrication of a ceramic aerogel metamaterial. (A) Illustration of the meta-structure design of ceramic aerogels (the unit of the scale bar for NPR is kPa, and that for NTEC is % with strain zoomed by 30 times). (B) Illustration of CVD synthesis process of the double-paned hyperbolic ceramic aerogels. The non-contact freeze drying technique is used to render hyperbolic structure in graphene aerogel templates by manipulating the ice crystal growth direction.
Figure 2:
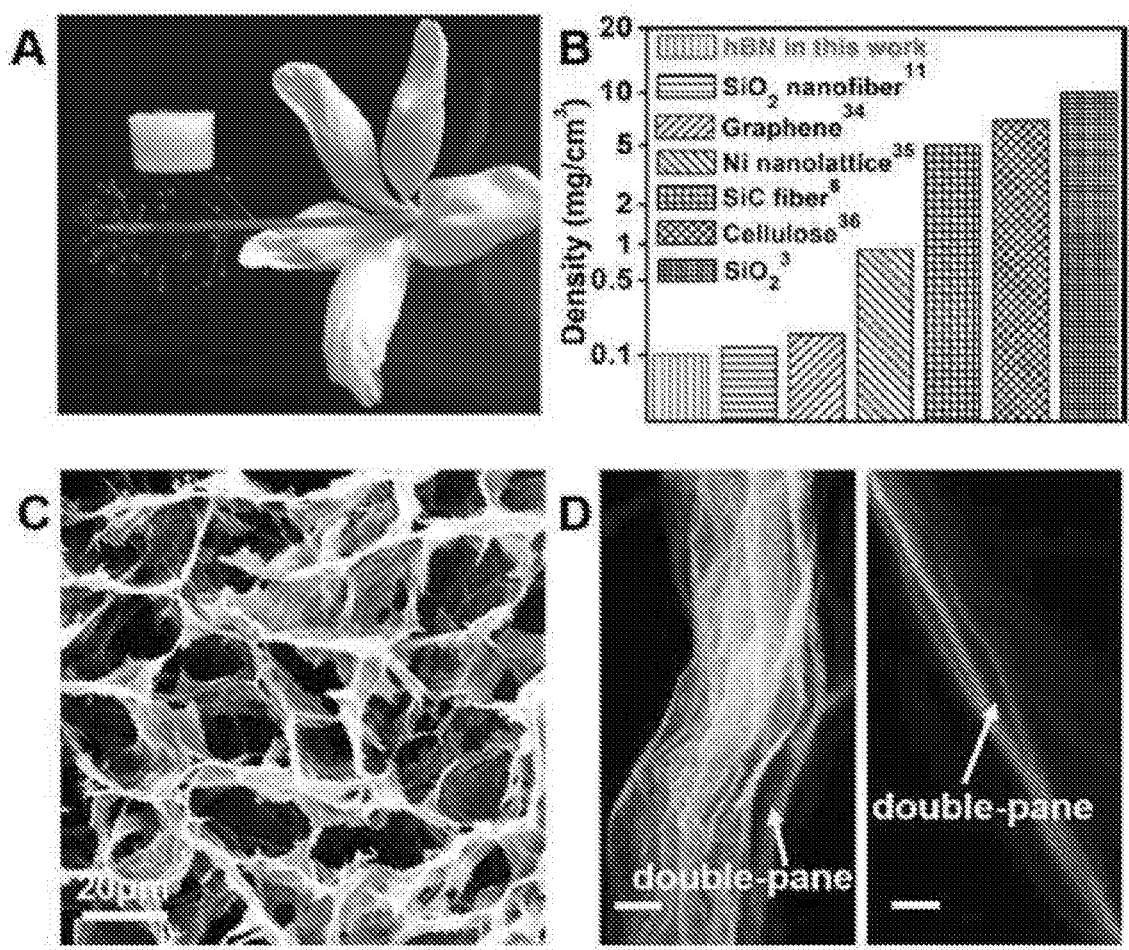
FIG. 2. Material characterization of hBNAGs. (A) An optical image showing an hBNAGs sample standing on the stamen of a flower. All tests are done on the ceramic aerogels with a density of about 5 mg/cm$^3$ unless otherwise mentioned. (B) The lightest hBNAGs sample compared with other ultralight materials. (C) SEM image of hBNAGs. (D) SEM images of the double-paned wall structured hBNAGs (all scale bars are 20 nm).
Figure 5:
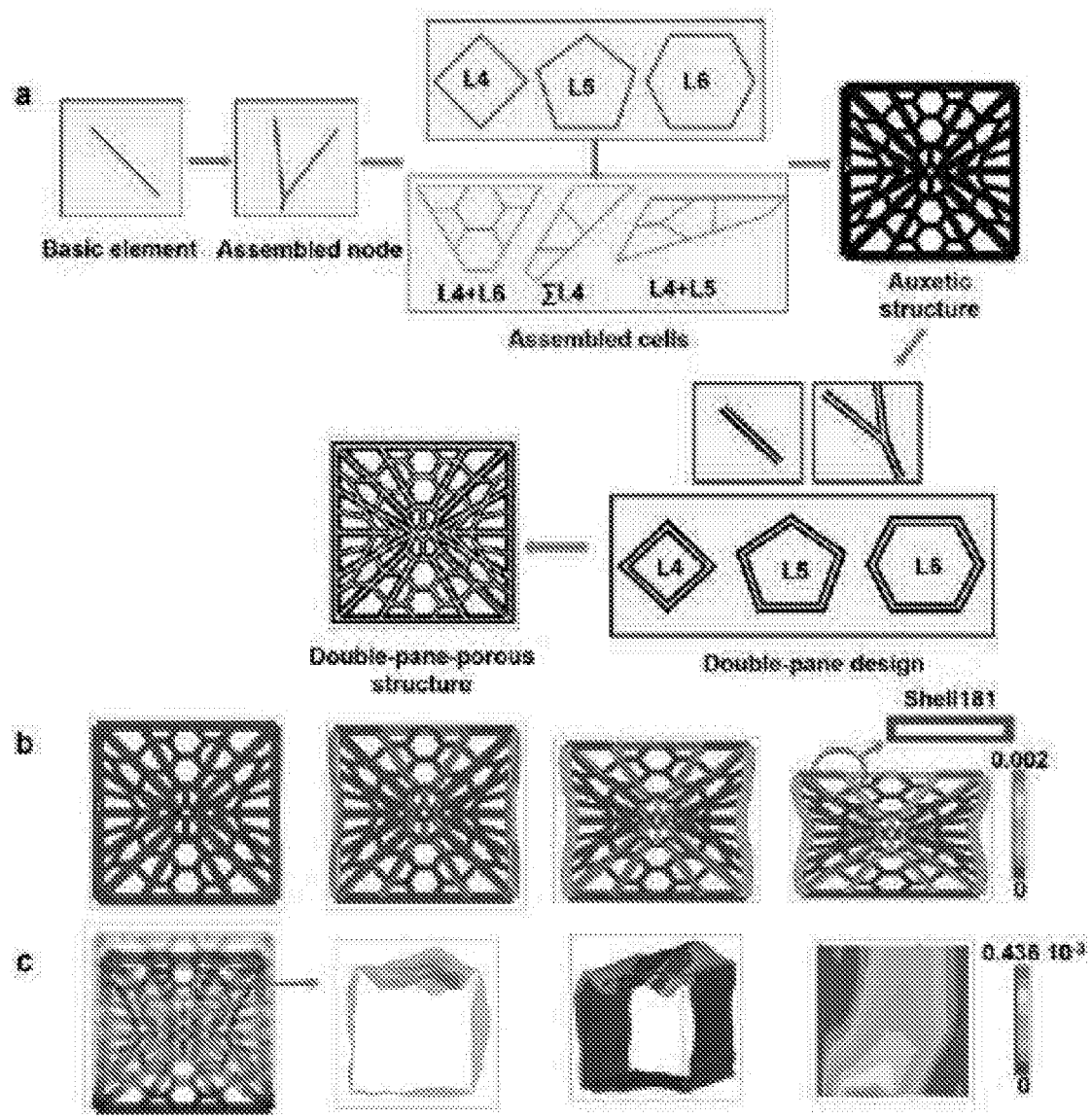
FIG. 5. Structure design of ceramic aerogels by FE method. (a) Design of the model. (b) NPR analysis. (c) NTEC analysis.
Figure 6:
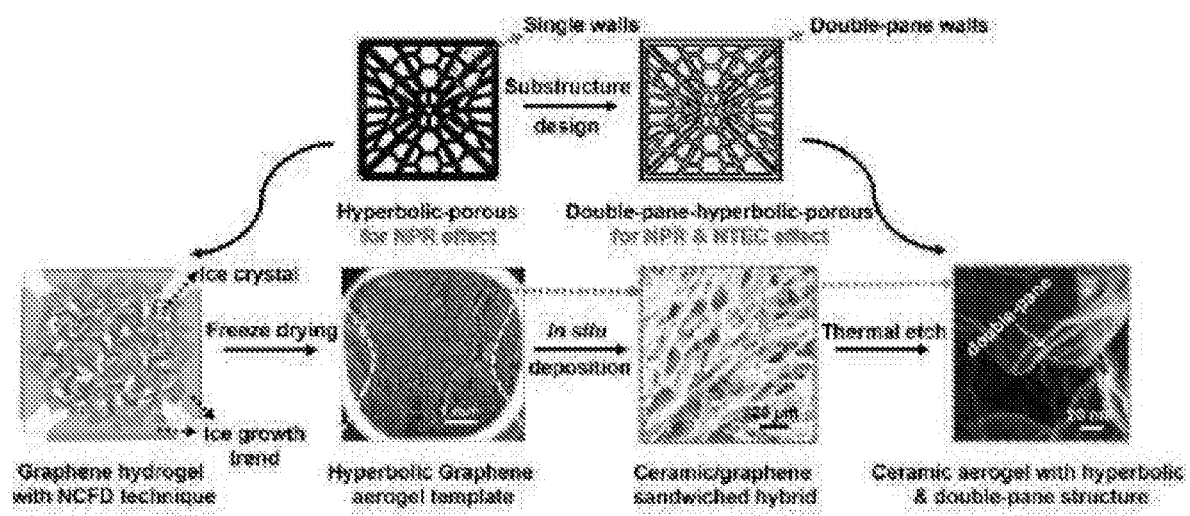
FIG. 6. Realization of the structure design features for NPR and NTEC in the produced ceramic aerogels. According to the structure design, the hyperbolic-porous structure induced the NPR behavior, while the further double-paned substructure triggered the NTEC effect. In the experiments, fabrication is made of a hyperbolic-porous graphene aerogel template by modified hydrothermal reduction (MHR) and non-contact freeze-drying (NCFD) techniques. After in situ CVD deposition of ceramics on the template, this hyperbolic-porous structure was replicated. Then via the thermal etching technique to remove the graphene templates, the double-paned wall substructure was finally realized in the ceramic aerogels.
Figure 7:
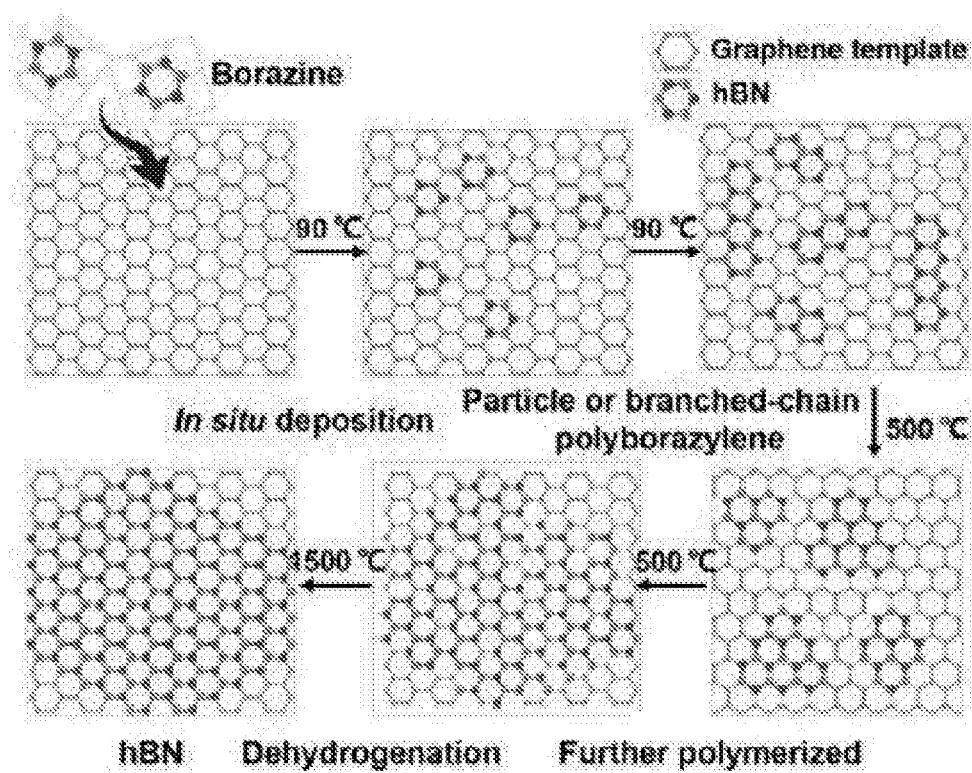
FIG. 7. The CVD growth mechanism from borazine to hBN on graphene template. Borazine firstly self-condensed into the branched-chain or partially cross-linked polyborazylene at about 90° C., which further polymerized into amorphous BN coating on GA template via dehydrogenation at about 500° C. Upon further annealing at about 1500° C., the amorphous BN crystalized into the highly ordered hBN layers on GA.
Figure 8:
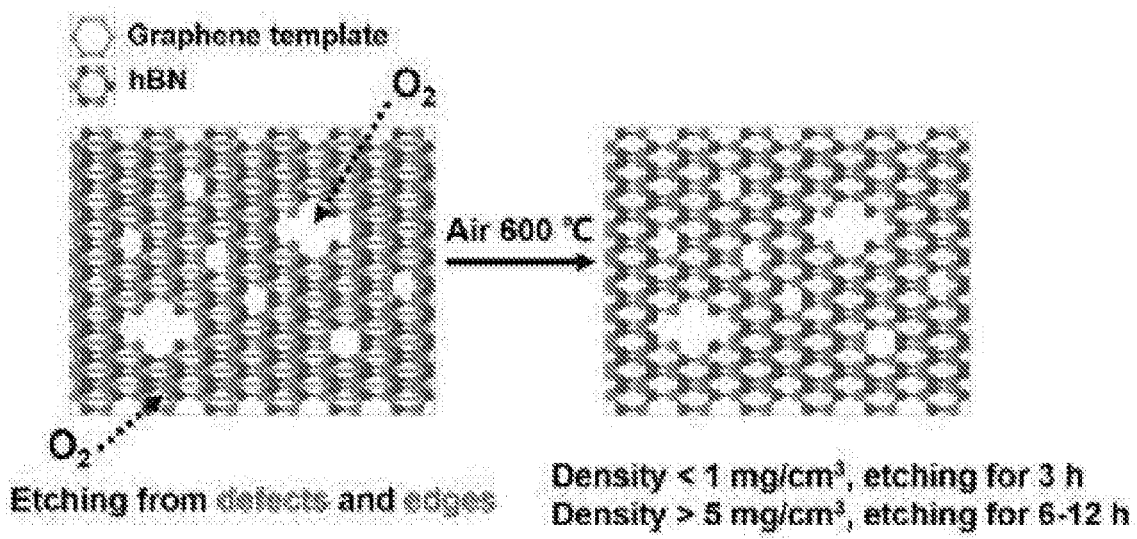
FIG. 8. The thermal etching mechanism of the graphene aerogel template from the ceramic/graphene sandwiched hybrid. Graphene oxide is used as the precursor to make the graphene aerogel template. Therefore, there are a number of defects on the graphene sheets. After the in situ deposition of hBN, oxygen can gradually etch the graphene template from these defects and the layer edges. Increasing hBN deposition time leads to thicker hBN layer and better encapsulation of such defects, in which case longer etching time up to about 12 h (vs. about 3 h) is performed to substantially completely remove the graphene template.
Figure 9:
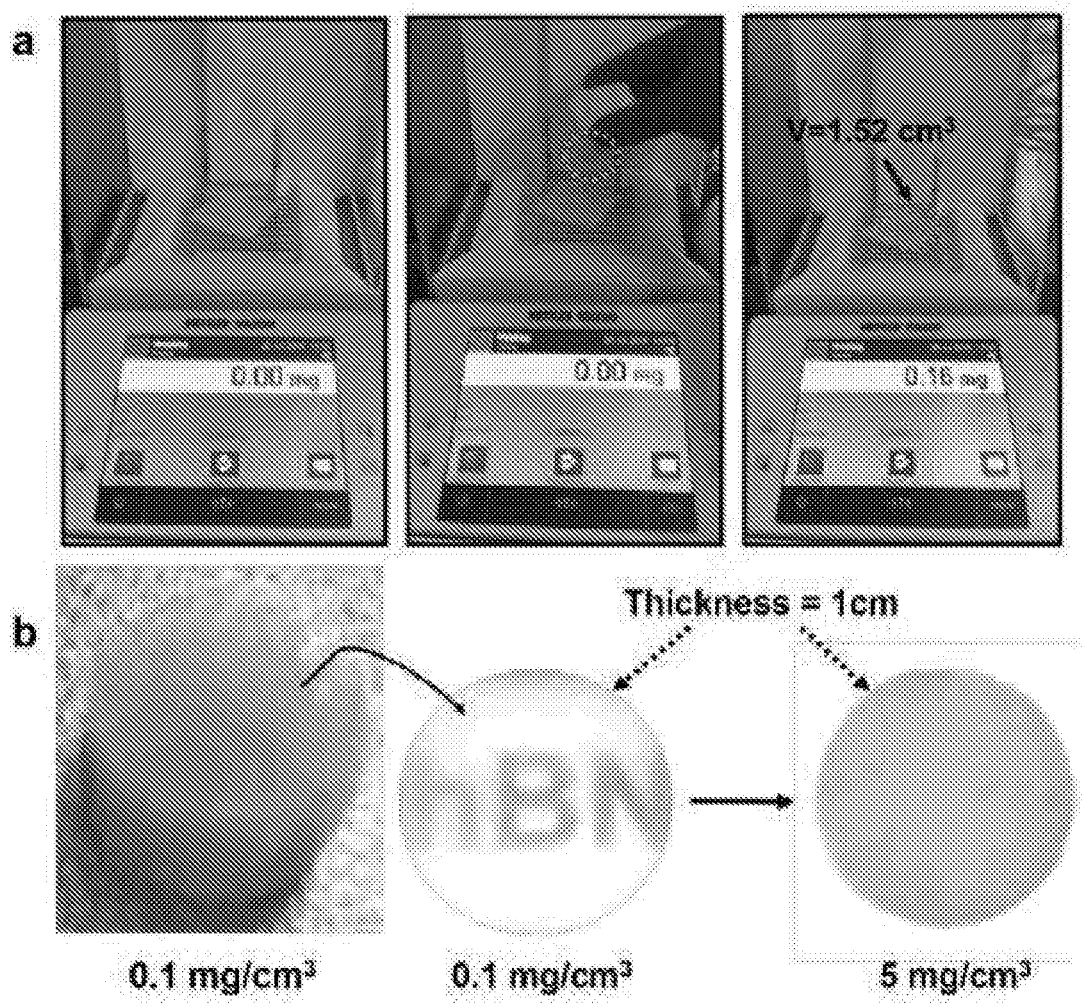
FIG. 9. Physical property measurement of the lightest hBNAG sample in ambient conditions. (a) Density measurement. (b) Optical properties of hBNAGs with different densities. The hBNAG with a density of about 5 mg/cm³ appeared mostly white color like typical bulk ceramics due to the light scattering effect. However, when the sample density reduced to about 0.1 mg/cm³, its color changed from white to semitransparent.
Figure 10:
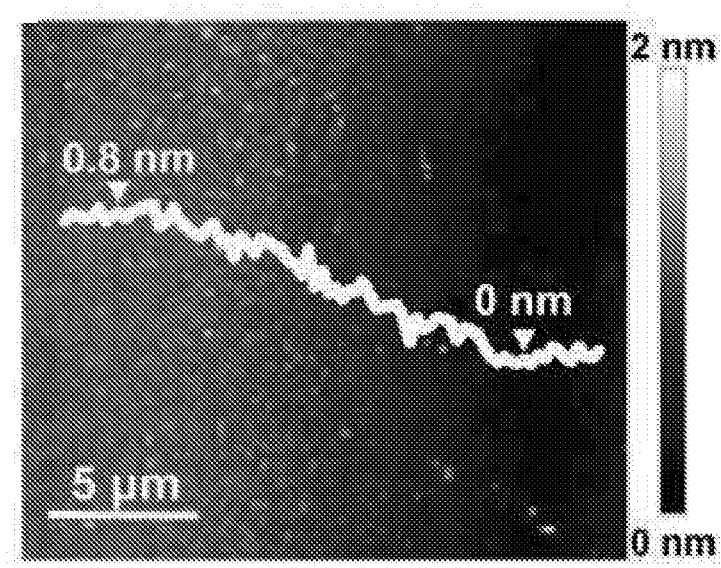
FIG. 10. AFM images of the cell walls of the hBNAGs sample with a density of about 0.1 mg/cm³.

A hierarchical porous structure is designed with hyperbolic architecture to obtain a NPR (FIG. 1A). The sub-cells partitioned with double-paned walls to reduce the wall thickness without compromising the mechanical strength and facilitate the out-of-plane vibration modes for NTEC. This meta-structure design ensures widely distributed compressive strain under mechanical or thermal excitations (FIG. 5). To obtain the designed structure characteristics, the graphene aerogel templates are produced using a modified hydrothermal reduction and non-contact freeze drying technique, and then preparation is made of hBNAGs or β SiCAGs through a template-assisted chemical vapor deposition (CVD) process (FIGS. 1B and 6-8). For simplicity, the discussion focuses on hBNAGs. The resulting hBNAGs exhibit ultralow densities <about 10 mg/cm³, with the lowest density down to about 0.1 mg/cm³, establishing it as a member of the group of superlight solid materials (FIGS. 2A-B, and 9). The ultralow density of about 0.1 mg/cm³ is attributed to the highly porous structure with atomically thin cell walls (FIG. 10).

Figure 11:
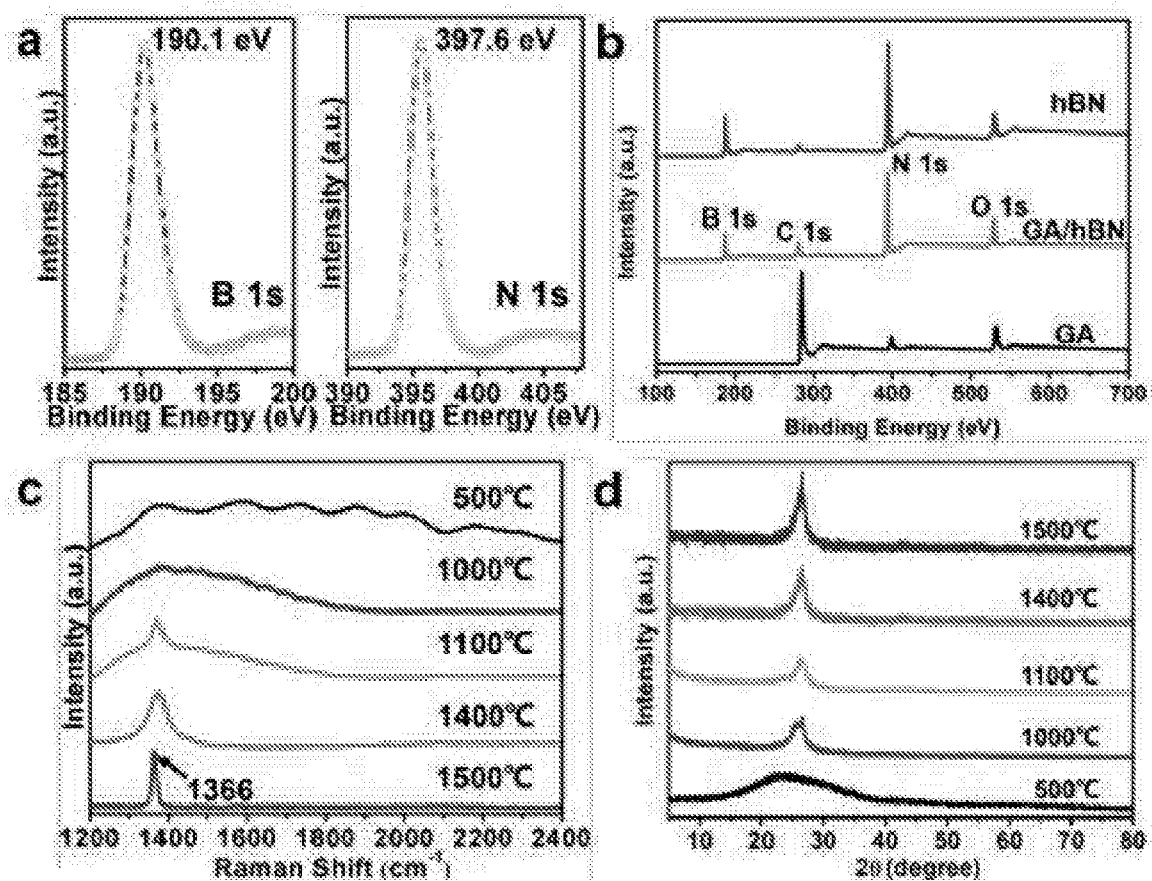
FIG. 11. Material characterization of hBNAGs. (a) B is and N is XPS spectrum of hBNAGs (B and N 1S peaks at about 190.1 eV and about 397.6 eV). (b) XPS spectrum of graphene aerogel template, hBN/graphene hybrid, and hBNAG. (c) Raman spectra of hBNAGs after different pyrolysis temperatures (characteristic peak at about 1366 cm$^{-1}$). (d) XRD spectrum of hBNAGs annealed at different temperatures (characteristic peak at about 26.4°).
Figure 12:
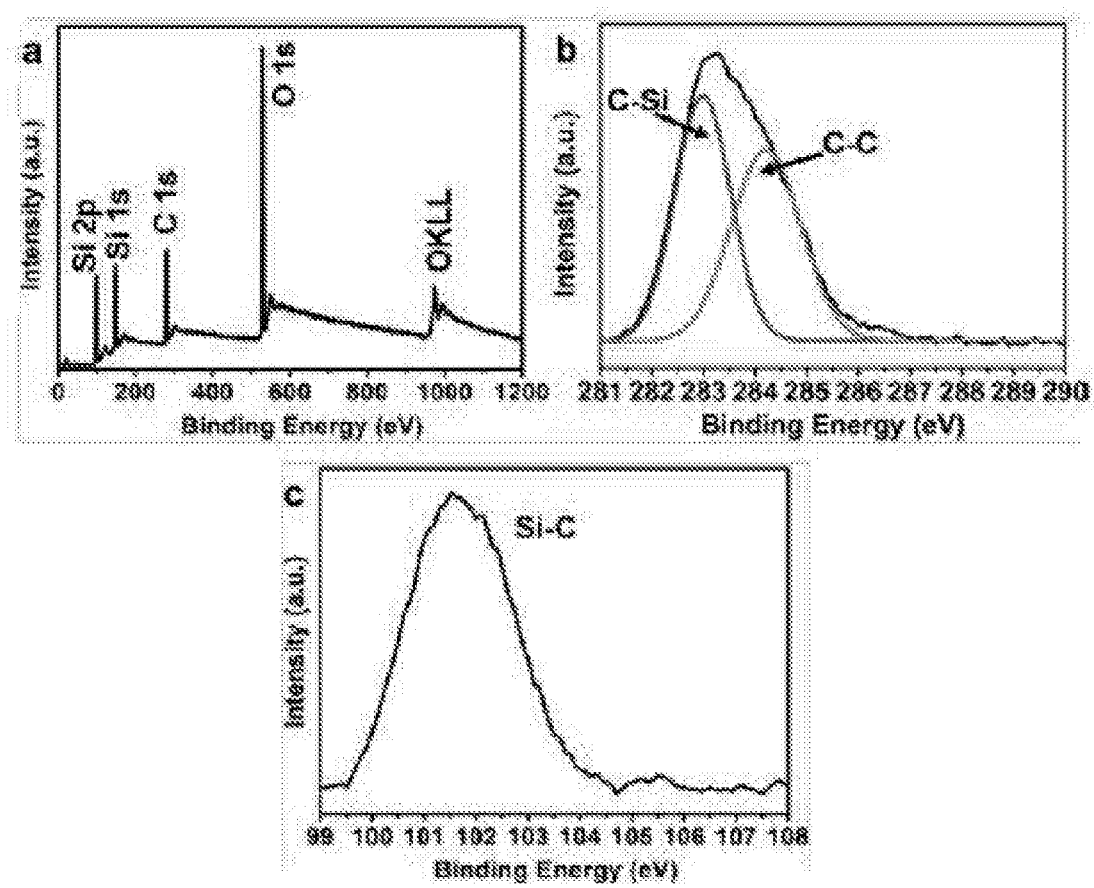
FIG. 12. XPS spectrum of βSiCAGs. (a) XPS spectrum of βSiCAGs. (b-c) C and Si XPS spectrum of βSiCAGs.
Figure 13:
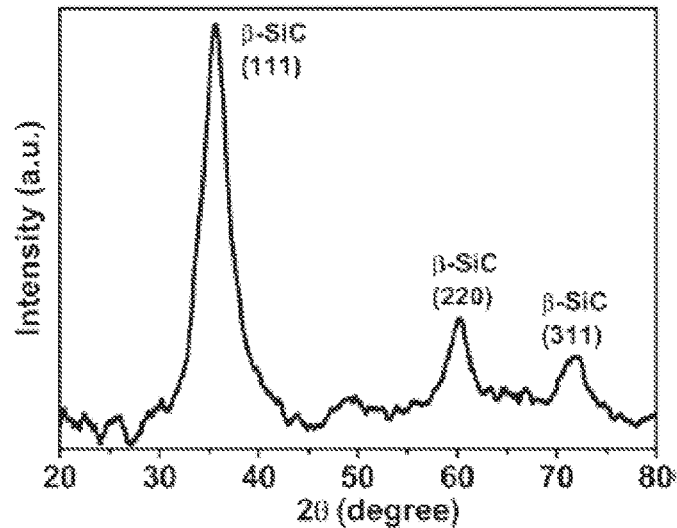
FIG. 13. XRD spectrum of βSiCAGs.
Figure 14:
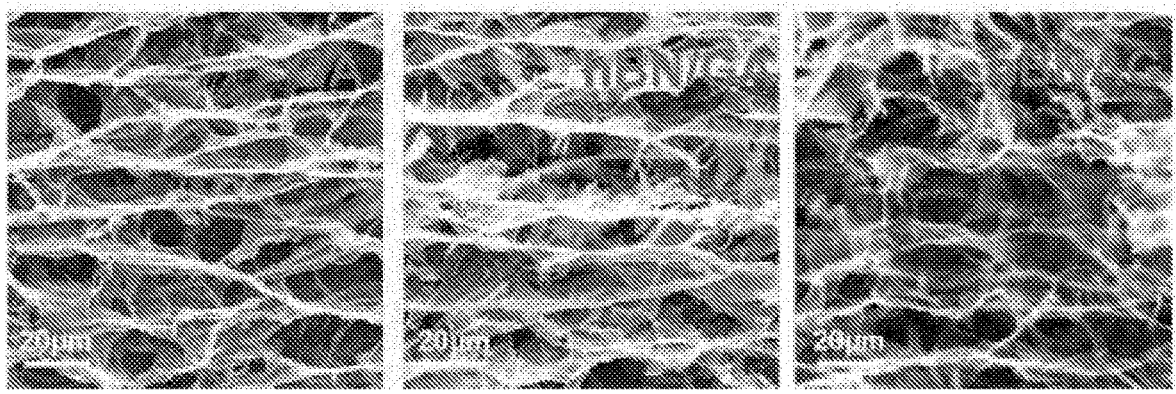
FIG. 14. SEM images of structure evolution from graphene aerogel template to hBNAG.
Figure 15:
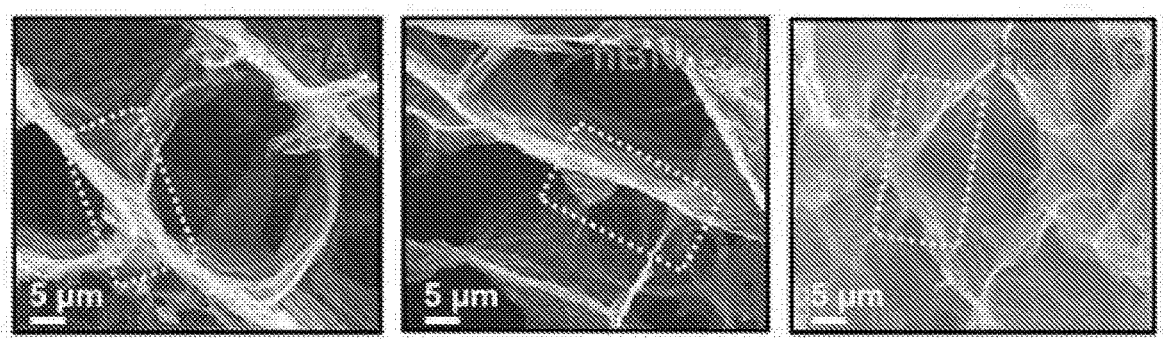
FIG. 15. SEM images of facial-linking pattern between cell walls from graphene aerogel template to hBNAG.
Figure 16:
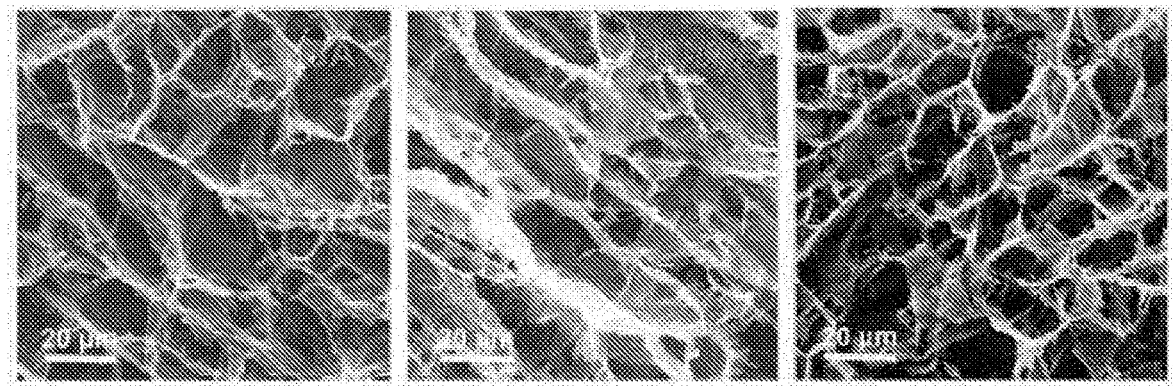
FIG. 16. SEM images of structure evolution from graphene aerogel template to βSiCAG.
Figure 17:
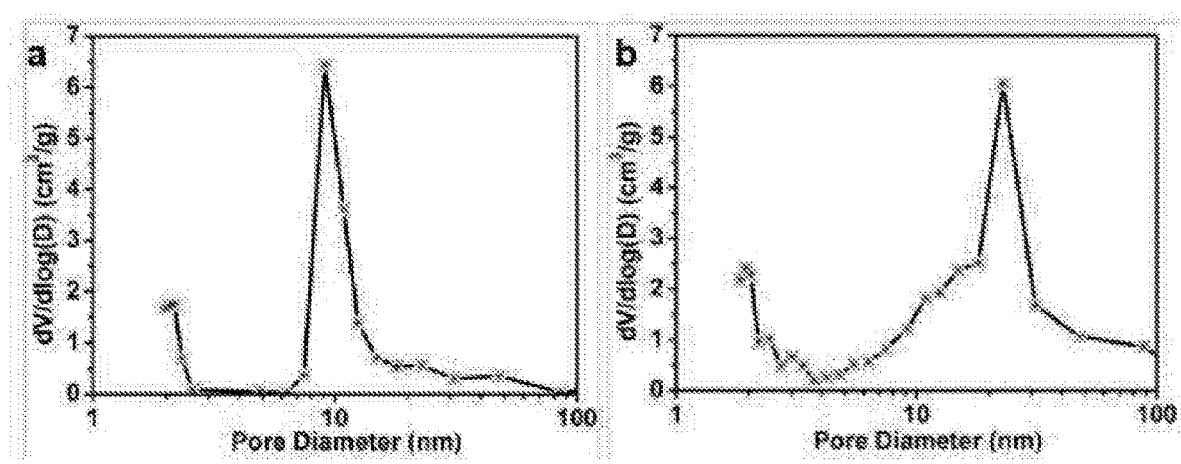
FIG. 17. BET measurement of the gap size of the double-paned structures in hBNAGs. (a) Gap width of about 9.5 nm. (b) Gap width of about 22.3 nm.
Figure 18:
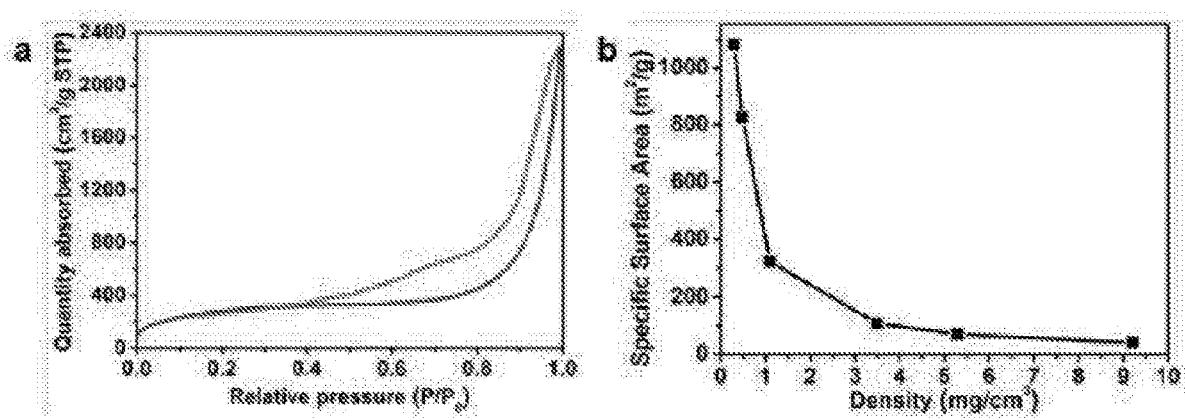
FIG. 18. BET results of hBNAGs. (a) The $N_2$ adsorption/desorption isotherms of hBNAGs at about 77 K. (b) BET surface area as function of the density of hBNAGs.
Figure 19:
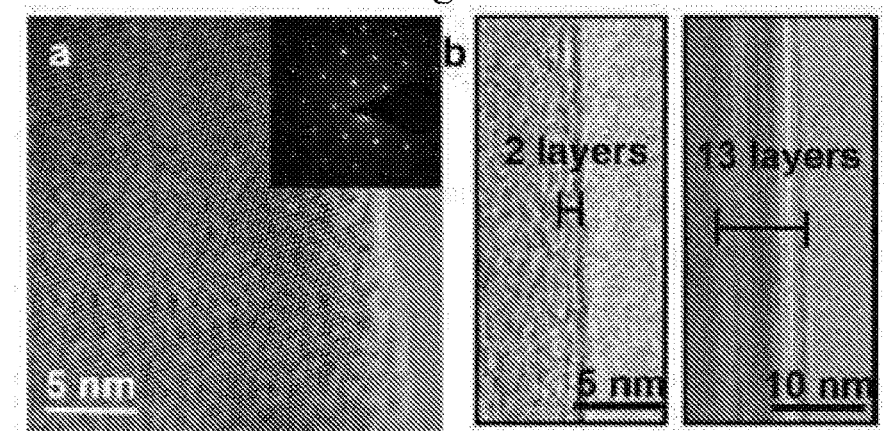
FIG. 19. TEM image of hBNAGs. (a) TEM image of the crystalline hBNAG cell walls and the corresponding SAED (inset). (b) Cross section TEM images of the thickness of hBNAG cell walls.
Figure 20:
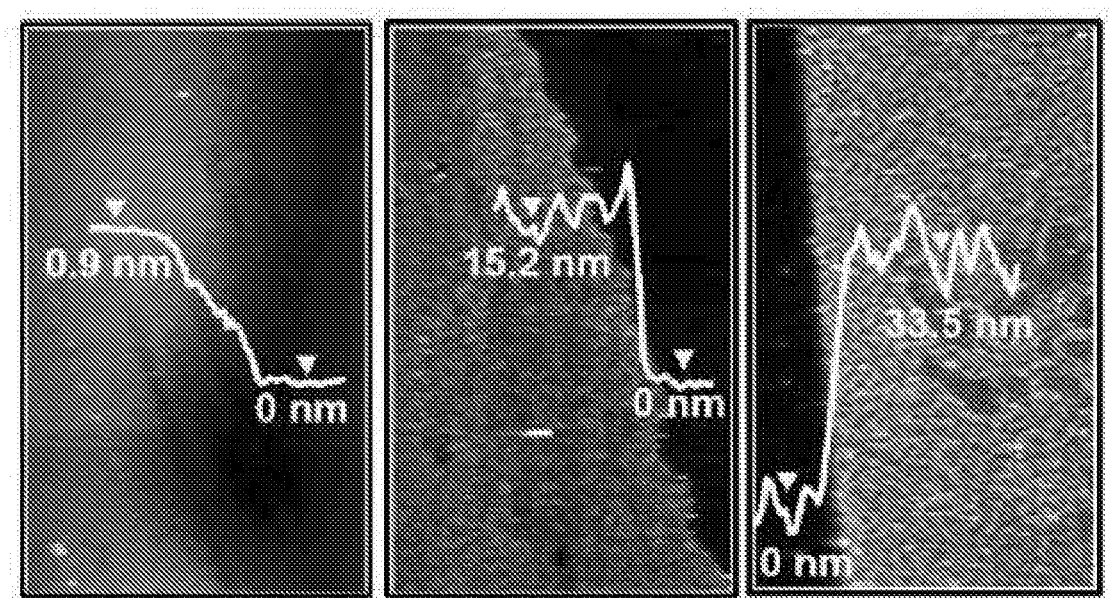
FIG. 20. AFM images of the cell walls of the hBNAG samples.

Characterization is made of the chemical composition and crystallinity of hBNAGs using X-ray photoelectron spectroscopy (XPS), Raman spectra, and X-ray diffraction (XRD) (FIG. 11). The results from these characterizations reveal highly crystallinity nature of the hBN in the aerogel framework. In particular, the characteristic Raman and XRD peaks for hBN gradually narrow with increasing intensity upon annealing at higher temperature, indicating a systematic structural evolution from amorphous to polycrystalline BN. Detailed structural characterizations of βSiCAGs are also performed (FIGS. 12 and 13). Investigation is made of hBNAGs morphology and structure by scanning electron microscopy (SEM), Brunauer-Emmett-Teller (BET), spherical aberration corrected transmission electron microscopy (TEM) and atomic force microscopy (AFM). The microstructure of the hBNAGs remained essentially the same as the graphene aerogel templates (FIGS. 2C and 14) with the same facial-linking pattern between cell walls (FIG. 15, and βSiCAGs in FIG. 16). Thermal etching of graphene templates from the hBN/graphene sandwiched hybrids allows formation of double-paned wall structures (FIG. 2D). The high bending stiffness of hBN prevented face-to-face collapse. The average gap size between the double-paned walls can be tuned from a few to tens of nanometers (FIGS. 2D and 17) by controlling the wall thickness of graphene templates. The hBNAGs exhibited an ultrahigh porosity of about 99.99% and larger specific surface area of about 1080 m²/g (FIG. 18) than other ultralight materials (about 800 m²/g for silica or carbon aerogels). The cells walls were made of highly crystalline hBN from planar view TEM and selected area electron diffraction (SAED) studies (FIG. 19). The cell walls are composed of single or multi-layer well-ordered hBN with clearly resolved interlayer spacing of about 0.33 nm (FIG. 19), which is confirmed with AFM studies (FIG. 20). The wall thickness varied between about 1 to about 100 nm depending on the precursor concentration in the CVD chamber.

Figure 3:
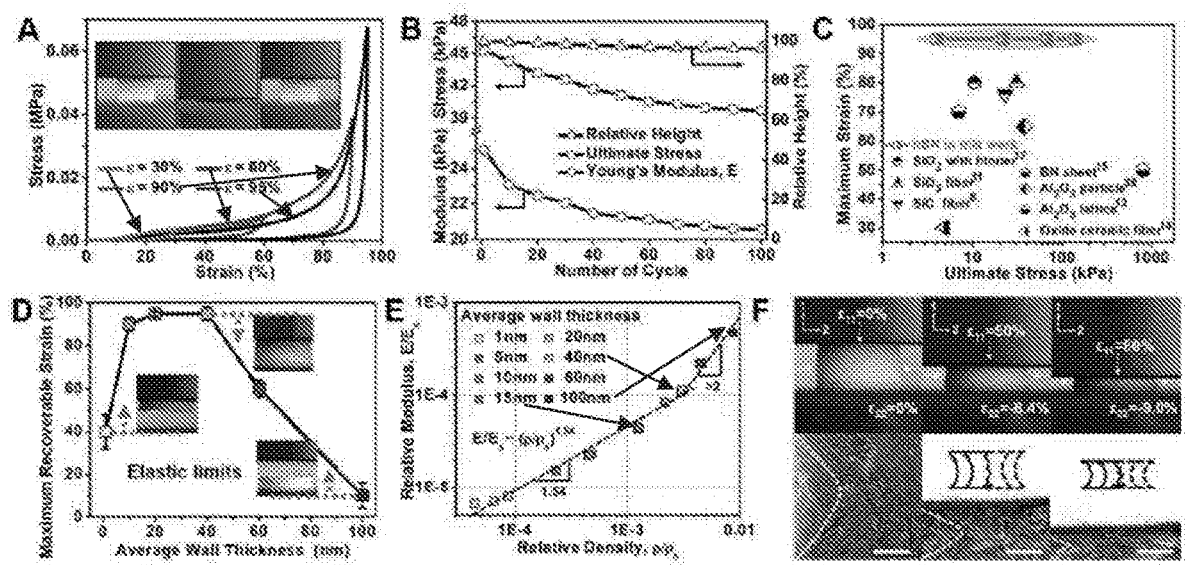
FIG. 3. Mechanical properties of hBNAGs. (A) Uniaxial compression of hBNAGs with repeatable strain up to about 95%. Inset: experimental snapshots of one compression cycle. (B) The ultimate stress, Young's modulus and relative height for 100 compression cycles. (C) The maximum strain and ultimate stress of the hBNAGs compared with other ceramic aerogels. (D) The maximum elastic deformability of hBNAGs as a function of the wall thickness. Inset: morphologies of hBNAGs with different wall thickness beyond their maximum elastic strains. (E) The relative modulus (specified as the measured Young's modulus, E, divided by the Young's modulus of the constituent bulk solid, $E_s$) of hBNAGs at relative densities. (F) Experimental snapshots of cross-section views and the corresponding SEM images of the NPR behavior of the hBNAGs under uniaxial compression (all scale bars are 1 mm).
Figure 21:
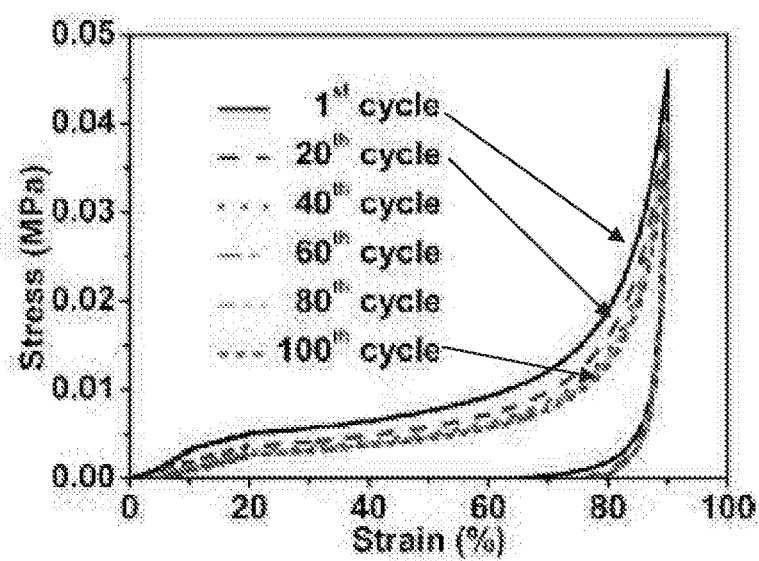
FIG. 21. The stress-strain curves of hBNAGs at about 90% strain for 100 cycles.
Figure 22:
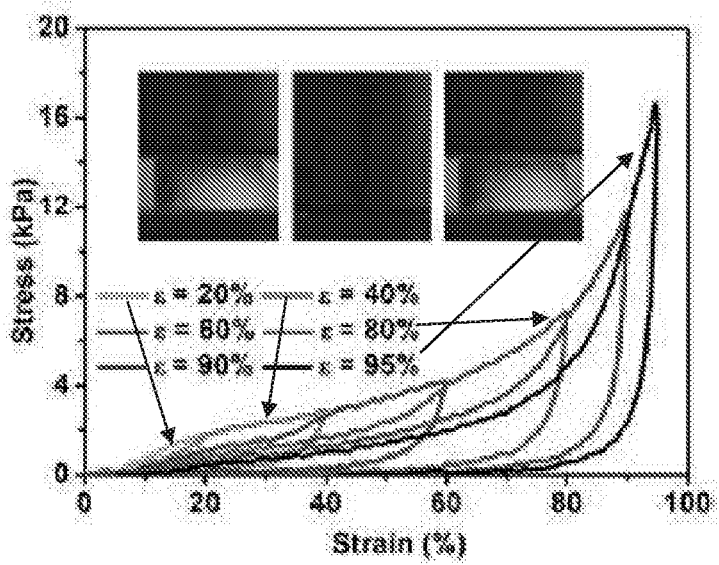
FIG. 22. Uniaxial compression of βSiCAGs.

Investigation is made of the mechanical properties of the hBNAGs with uniaxial quasi-static compression (FIG. 3). The sample is compressed from about 10 mm to about 0.5 mm, a strain of about 95%, and the original configuration is recovered after pressure release (FIG. 3A). The recoverable strain is higher than values for other ceramic aerogels, which top out at about 80%. It is further shown that the hBNAG sample can be repeatedly compressed at about 90% strain for over 100 cycles with little structure degradation (FIG. 21). The Young's modulus is as high as about 25 kPa for the first cycle with a slightly shrinking hysteresis loop during the next 20 cycles. The loop remains nearly unchanged up to the 100th cycle. The aerogel height remains nearly the same as the original value (residual strain <about 4%), and the ultimate stress and Young's modulus gradually reach their equilibrium states with total decreases of about 10% and about 18%, respectively (FIG. 3B) Similar superelastic behavior (strain up to about 95%) is found in βSiCAGs (FIG. 22), indicating the templating method should be a general one for making elastic ceramics. Together, the aerogels show attractive mechanical properties when compared to ceramic aerogels with 1D fibrous structures (FIG. 3C). For hBNAGs, the maximum strain of about 95% compared to about 80% for $SiO_2$ aerogels, the ultimate stress is up to about 0.14 MPa compared to about 0.03 MPa for $Al_2O_3$ aerogels, and the strength loss is about 10% at $\varepsilon_{100}$=about 90% compared to about 40% at ε=about 50% in amorphous BN aerogels.

Figure 23:
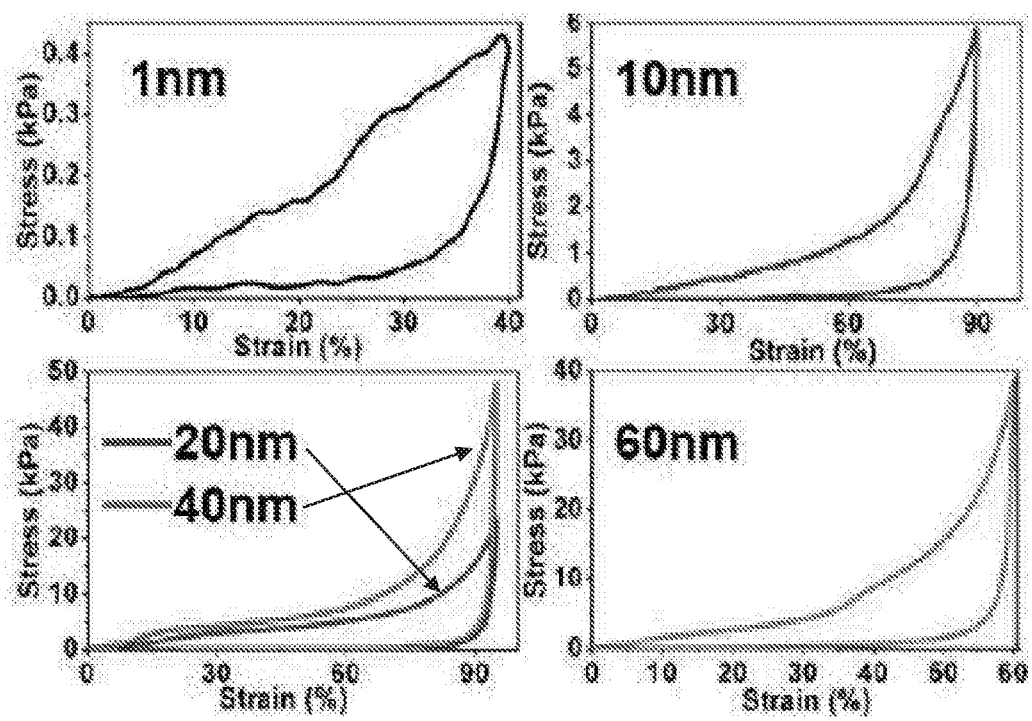
FIG. 23. Uniaxial compression of hBNAGs with different wall thickness.
Figure 24:
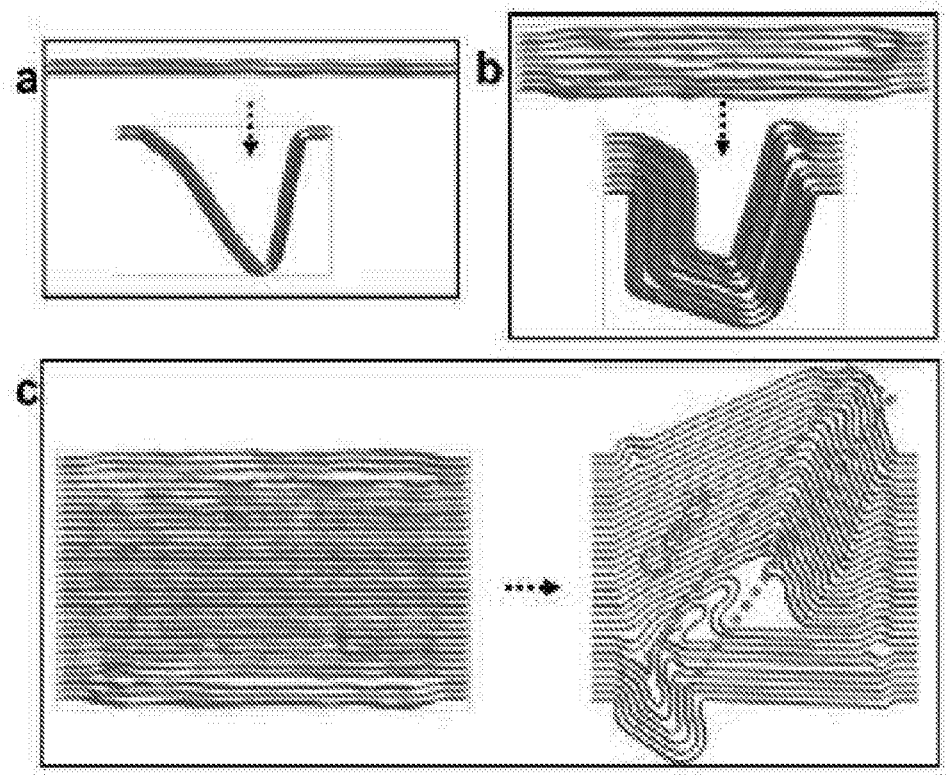
FIG. 24. MD simulations of the deformability of hBNAGs with different wall thickness. (a) 2-layer structure. (b) 8-layer structure. (c) 32-layer structure.

Next investigation is made of the dependence of the hBNAG deformation on the micro-scale wall thickness (FIGS. 3D and 23) and macro-scale morphology to optimize their mechanical robustness. The resilience of the walls determines the elastic behavior and depends on the wall thickness. Thin walls (<about 10 nm) have high elastic (about 40-90% strain) behaviors due to the small resilience. Increased wall thickness (up to about 40 nm) changes the deformability to super-elastic (about 90-95% strain). Thick walls (>about 60 nm) results in brittleness similar to other bulk ceramic materials and a drop in ductility of about 10% due to the confined bending deformation. The observation is consistent with molecular dynamics (MD) simulations (FIG. 24, 37). A different way to look at the behavior is by plotting the relative Young's modulus ($E/E_s$) versus the relative density ($\rho/\rho_s$) as it scaled linearly as $E/E_s \sim (\rho/\rho_s)^{1.54}$ (FIG. 3E). This scaling corresponds well with the flexibility of hBNAGs within about 1-40 nm wall thicknesses. Samples with larger wall thickness (>about 100 nm) exhibit a larger $E/E_s \sim (\rho/\rho_s)$ trend of >about 2, which is similar to rigid and brittle inorganic porous monoliths.

Figure 25:
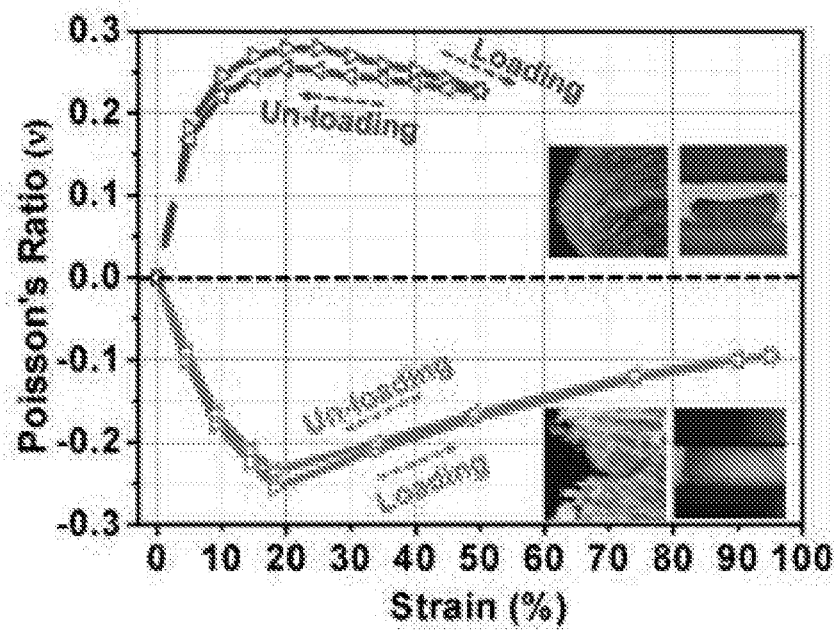
FIG. 25. Evolution of the Poisson's ratios as a function of compressive strain in one loading-unloading cycle. Inset: the SEM and optical images of deformability of hBNAGs with PPR and NPR. Compared to about 50% maximum elastic strain of the hBNAGs with normal PPR deformation behavior ($v_{peak}$=about 0.279), those with NPR ($v_{peak}$=about −0.255) present much higher elastic strain of about 95% and better recoverability, highlighting the important role of the macro-structure design in greatly enhancing the deformability of the hBNAGs.
Figure 26:
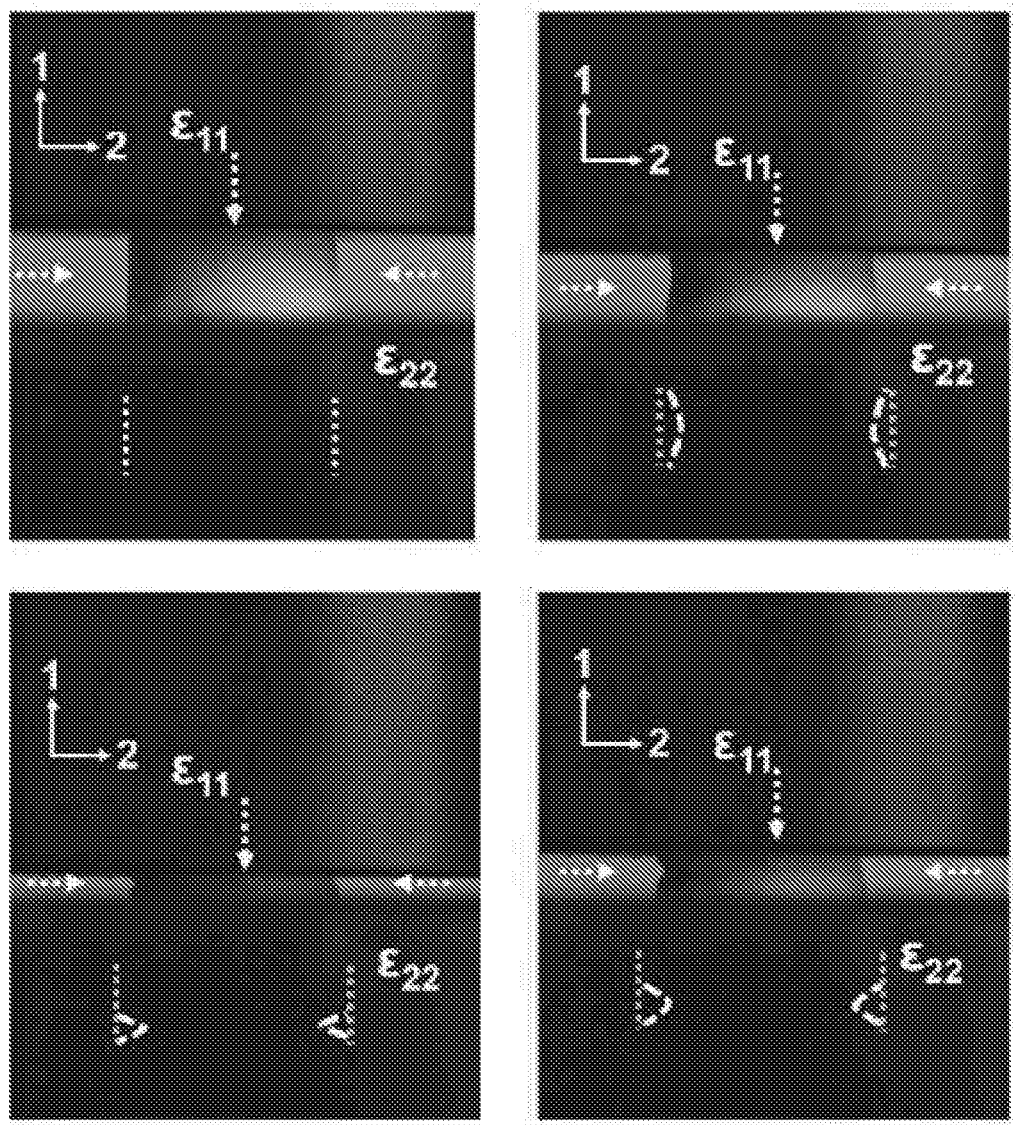
FIG. 26. Negative Poisson's ratio behavior of βSiCAGs.
Figure 27:
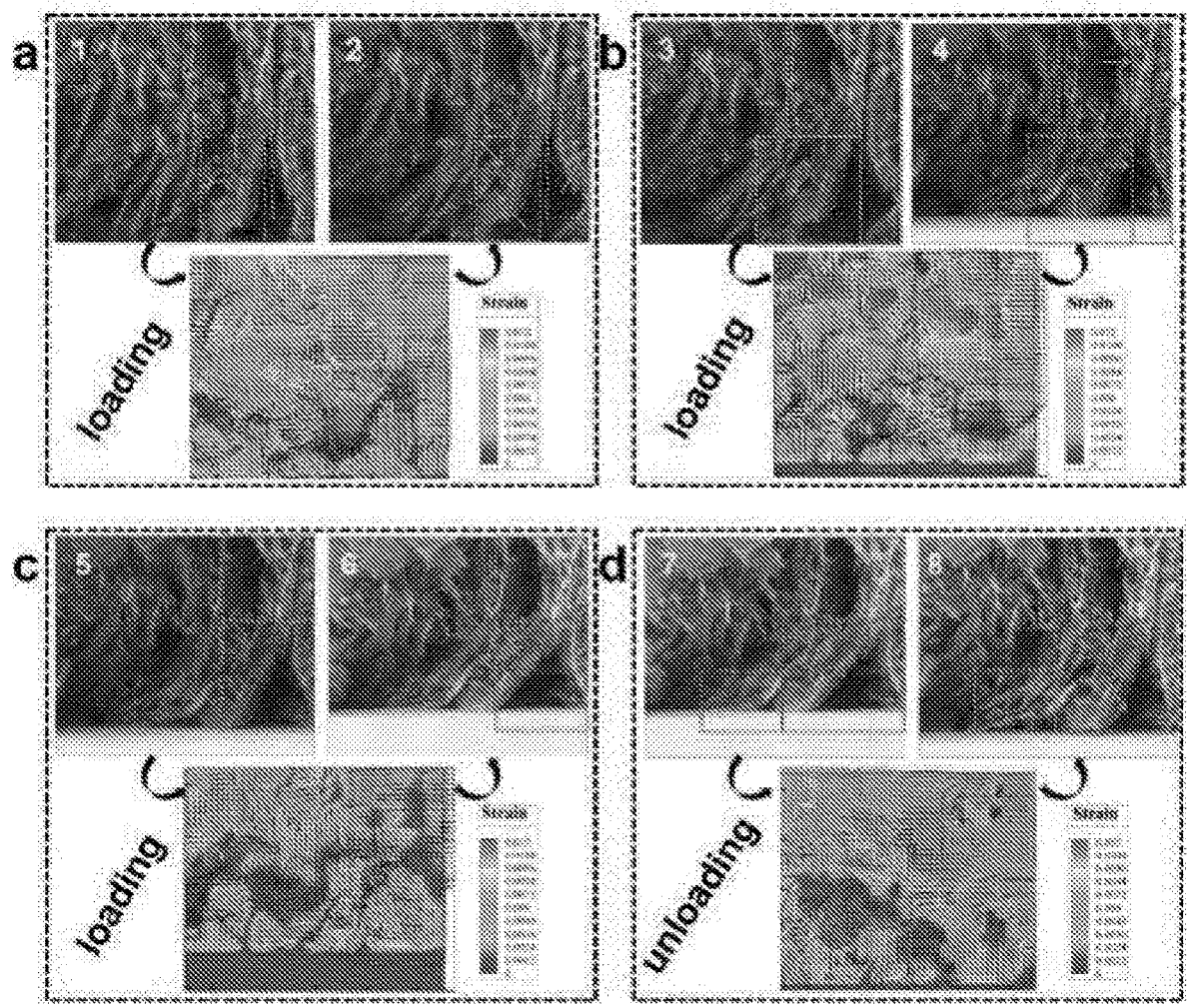
FIG. 27. In situ SEM observations with strain mapping analysis of hBNAGs. (a-c) Loading process. (d) Unloading process. Local displacements of microstructures in hBNAG are extracted by comparing SEM digital images at adjacent times using 2D digital image correlation. The strain mapping is estimated using the ratio of these relative displacements with respect to the sample length.

The theoretical structure design (FIG. 5) shows the mechanical benefits of having graphene aerogels with NPR instead of positive or zero Poisson's ratios. The hyperbolic-patterned macrostructure facilitates the bending Poisson's effect, and triggers the oriented out-of-plane "buckling" of the cell walls and widely distributes compressive strain during the uniaxial compression of the samples (FIGS. 3F, 25 and 26). This is demonstrated with in situ SEM observations and analysis of strain mapping (FIG. 27).

Figure 28:
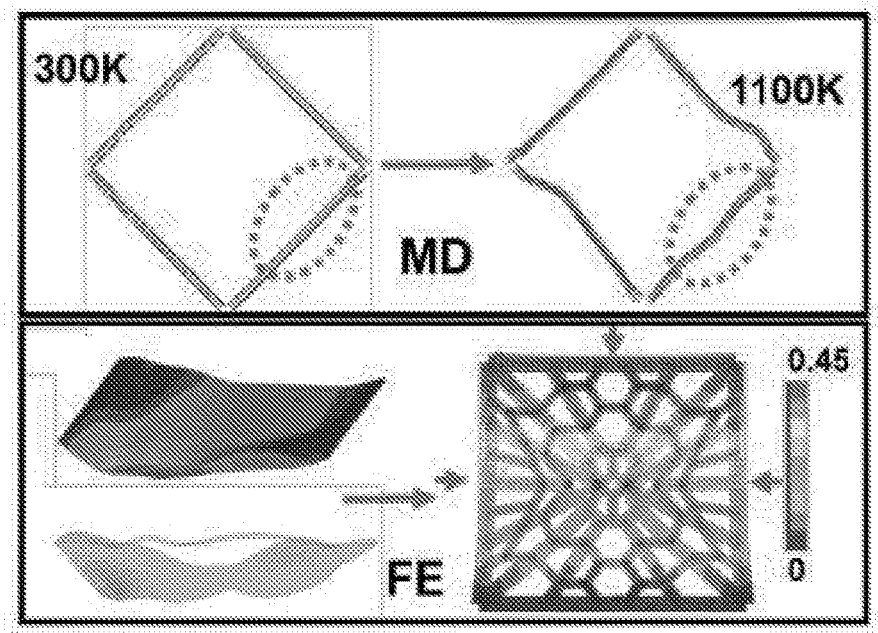
FIG. 28. MD and FE analysis of the thermally excited morphology change of hBNAGs.
Figure 29:
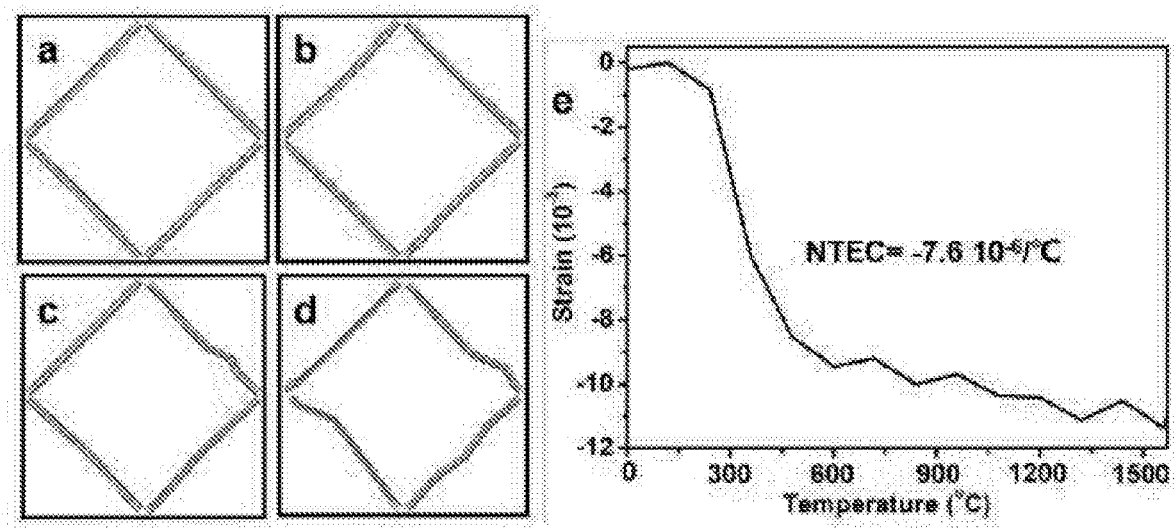
FIG. 29. MD simulations of hBNAGs under different temperatures. (a) 300 K. (b) 500 K. (c) 1100 K. (d) 1800 K. (e) The corresponding thermal expansion behavior.
Figure 30:
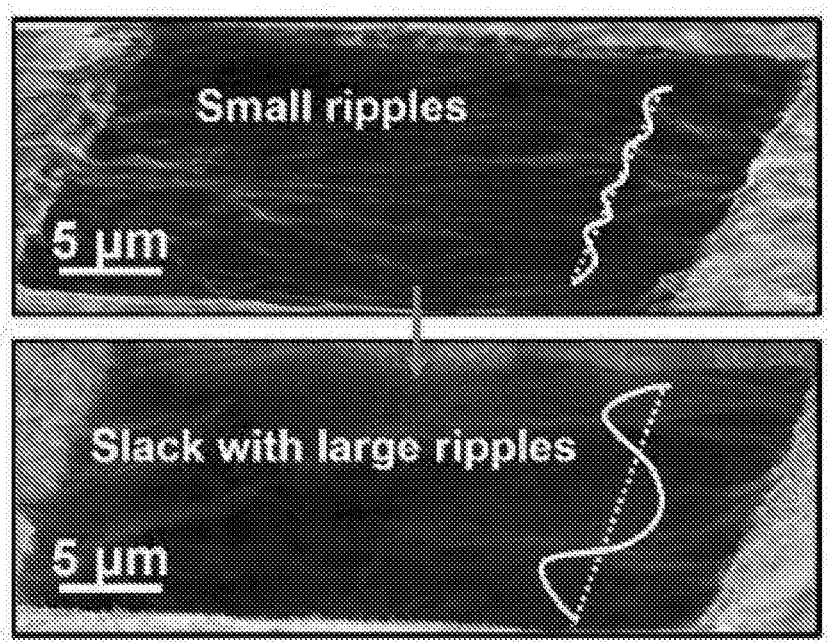
FIG. 30. SEM images at about 50° titling angle of cell walls of hBNAGs at different temperatures.
Figure 31:
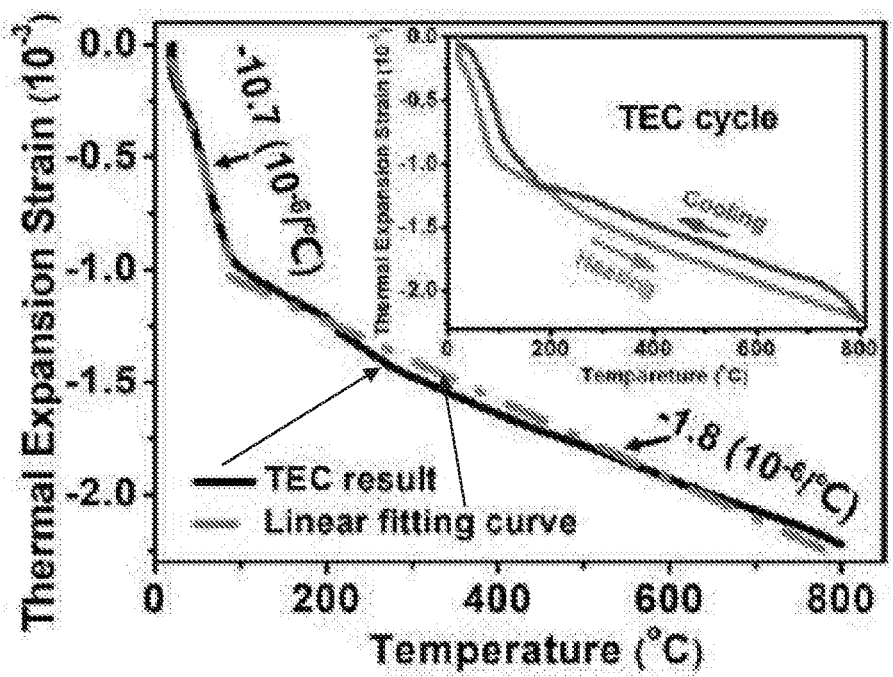
FIG. 31. Linear negative thermal expansion behavior of hBNAGs in experiments. The TEC was calculated via dividing the thermal expansion strain by the temperature variation value. Inset: one thermal expansion cycle to check sample restorability under thermally induced stress. The hBNAGs presented a linear NTEC of about $-10.7 \cdot 10^{-6}/°$ C. below about 80° C. and about $-1.8 \cdot 10^{-6}/°$ C. from about 80° C. to about 800° C., respectively. Furthermore, after the cooling process, the thermal strain recovered to its original value along the similar path as the heating process, exhibiting an excellent restorability of thermally induced strain in the hBNAGs.
Figure 32:
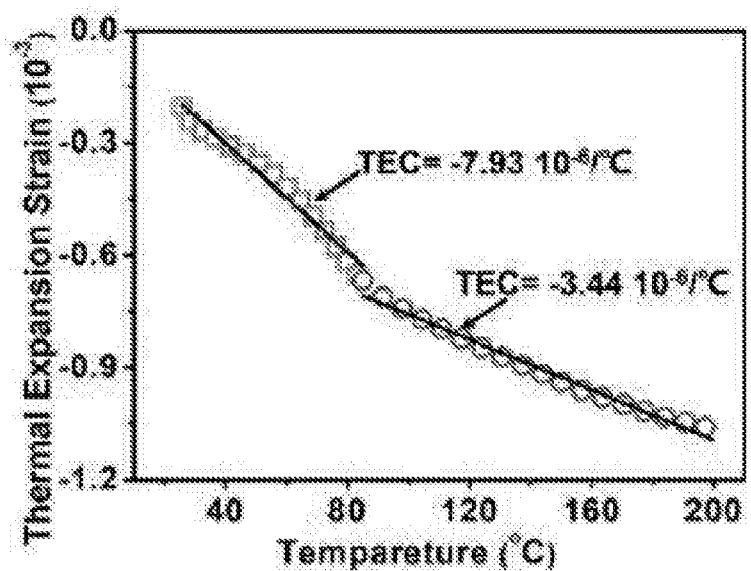
FIG. 32. Negative thermal expansion behavior of βSiCAGs in experiments.

Thermally excited ripples could induce negative thermal expansion behavior in 2D nanolayered structures. The double-paned structure design for the porous framework cell walls reduces the wall thickness for lower out-of-plane stiffness and releases additional degree of freedom to facilitate the out-of-plane vibration modes, leading to the contractions of the cell walls in the frameworks. Meanwhile, the highly porous frameworks provide sufficient deformation space for these thermally excited ripples, and the double-paned structures further reduce the reciprocal constrains between adjacent cell walls. As a result, realization is made of a framework structure with NTEC (as shown in MD and finite element (FE) analysis in FIGS. 5I, 28 and 29). A SEM image (FIG. 30) of the cell walls of hBNAGs suspended on a Cu grid shows small ripples at room temperature, which are likely formed during the deposition process. After annealing at about 800° C. and cooling back, these small ripples evolved into larger ones (a large alteration in the ripple geometry, with apparently larger amplitudes and longer wavelengths), indicating the slack of the sample due to the TEC mismatch between the substrate and sample. This behavior was similar to what is observed in graphene for NTEC property. Measurement is made of the effective TEC of the hBNAGs (FIG. 31). Bulk hBN has a TEC of about $40.5 \cdot 10^{-6}/°$ C. in the c direction, while the hBNAGs presents a linear NTEC of about $-10.7 \cdot 10^{-6}/°$ C. below 80° C. and about $-1.8 \cdot 10^{-6}/°$ C. at higher temperature. βSiCAGs also show linear NTEC behavior in FIG. 32. Compared to the general tensile fracture induced by positive thermal expansion, the thermal excited compression stress in the NTEC case can be dissipated by the superelasticity of the hBNAGs, opening a pathway to the enhanced thermal stability.

Figure 4:
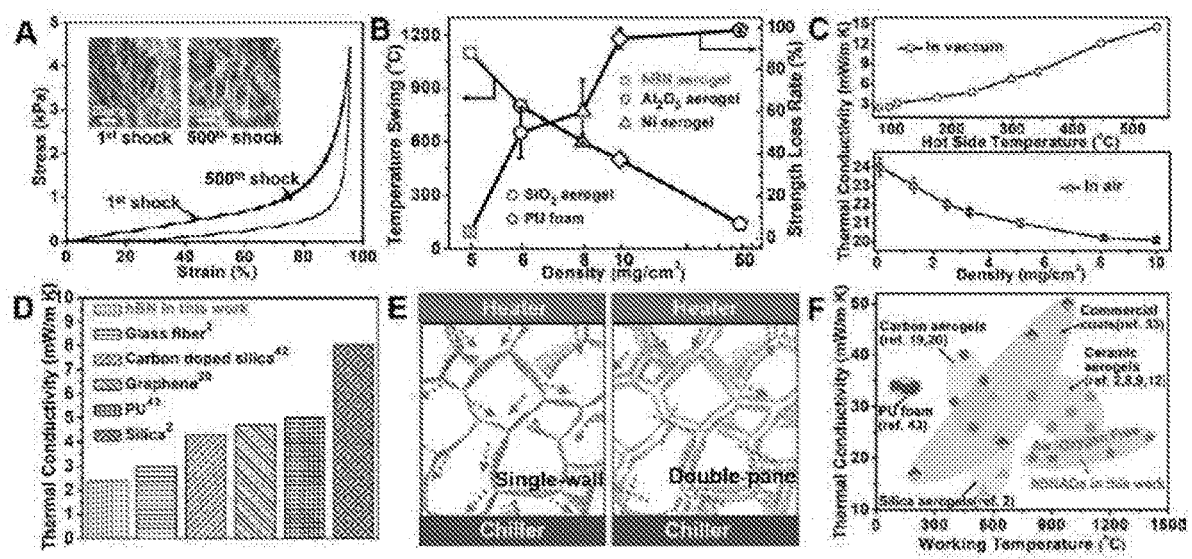
FIG. 4. Thermal stability and thermal insulation properties of hBNAGs. (A) The strain and stress evolution after 500 cycles of sharp thermal shocks (about 275° C./s). Inset: the SEM images of hBNAGs frameworks after the first and last thermal shock tests. (B) The temperature differential and strength loss rate of hBNAGs for the thermal shocks compared with other aerogel-like materials. (C) Thermal conductivity of hBNAGs in vacuum (steady-state thermal measurement) and in air (transient thermal measurement). (D) The vacuum thermal conductivity of hBNAGs compared with other aerogel-like materials. (E) The extra tortuous solid conduction path mechanism in double-paned hBNAGs. (F) Room temperature thermal conductivity in air versus working temperature for aerogel-like materials.
Figure 33:
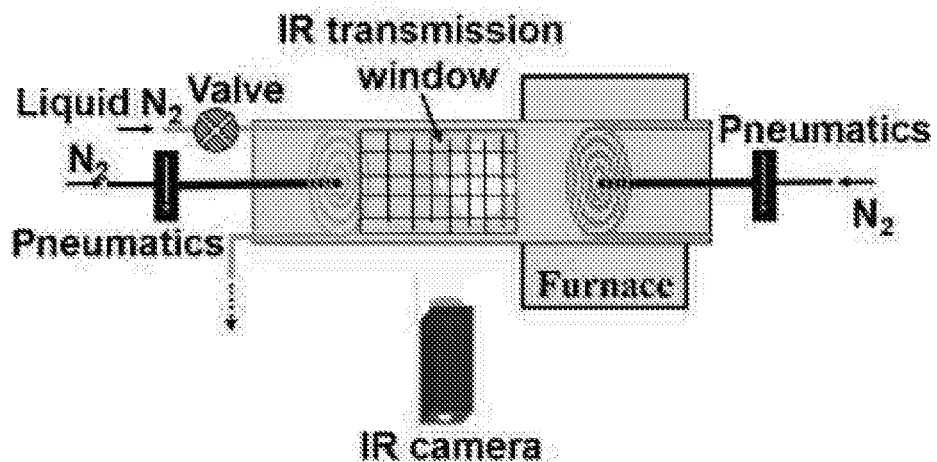
FIG. 33. A custom-designed thermal shock testing system for lightweight materials. Two pistons were fixed at both ends of the quartz tube. The left piston was cooled by liquid $N_2$ as cold source and the right one was heated by furnace as hot source. The ceramic aerogels were moved between the cold and hot sources by $N_2$ gas of the pneumatics devices. One IR transmission window was opened at the middle of the tube for IR measurement. By controlling the gas flow of the pneumatics devices, the ceramic aerogels can be heated or cooled at a specific rate to realize the thermal shock test for hundreds of cycles.
Figure 34:
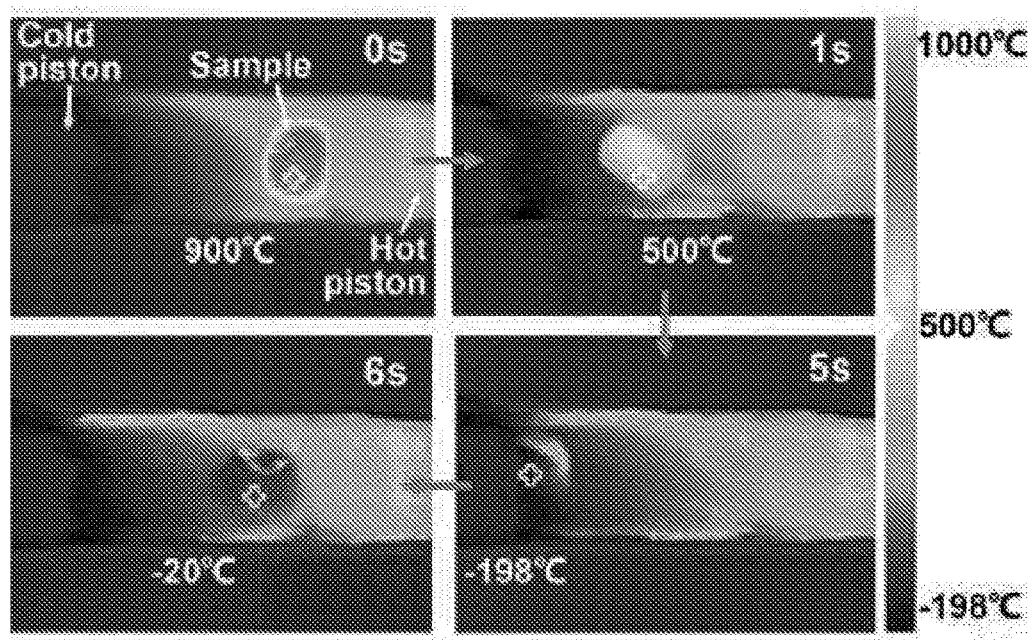
FIG. 34. Infrared images of hBNAGs in one thermal shock cycle by using the pneumatic thermal shock testing system.
Figure 35:
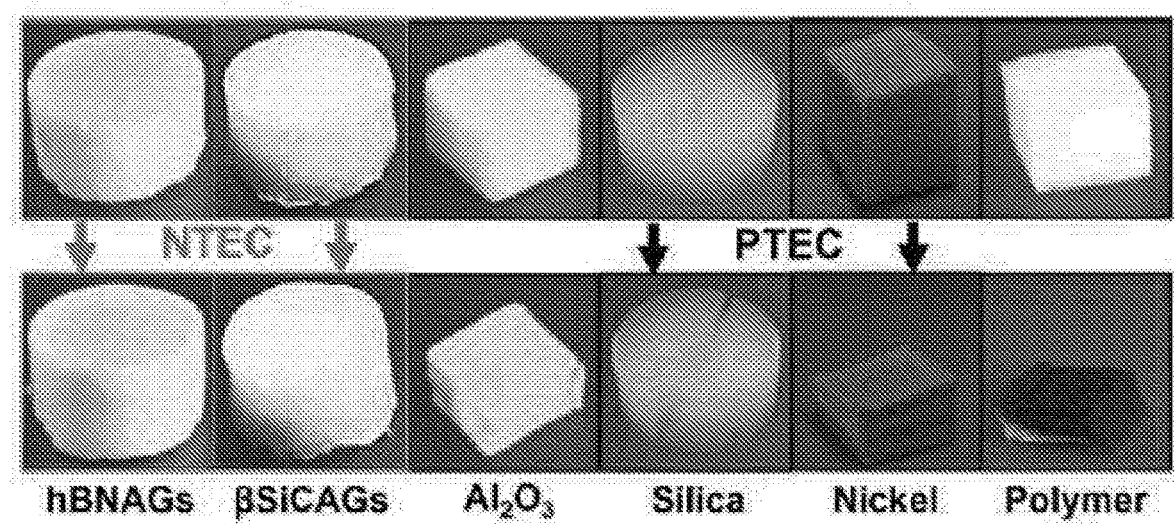
FIG. 35. Morphology changes of aerogel-like materials before and after the same thermal shock test.

Further investigation is made of the structural responses of hBNAGs under rapid thermal shocks. A pneumatic thermal shock testing system is designed for the lightweight aerogel materials (FIG. 33). By switching the pneumatic devices at the tube ends, the ceramic aerogels rapidly driven back and forth between the fixed hot and cold sources. Rapid heating is made of the hBNAGs to about 900° C. and cooled to about −198° C. with a frequency up to about 0.1 Hz and temperature variation speed up to about 275° C./s (FIG. 34). The mechanical strength and structure variation after 500 thermal shock cycles are evaluated (FIG. 4A). The porous structure retained its original morphology (FIG. 4A inset), and ultimate stress and maximum strain remain essentially unchanged. This indicated excellent structural stability and resistance to drastic temperature variations. The NTEC material endured larger temperature swings (about 1100° C.) than silica aerogels (<about 600° C.) with even less strength degradation (about 3%) (FIG. 4B and FIG. 35).

Figure 36:
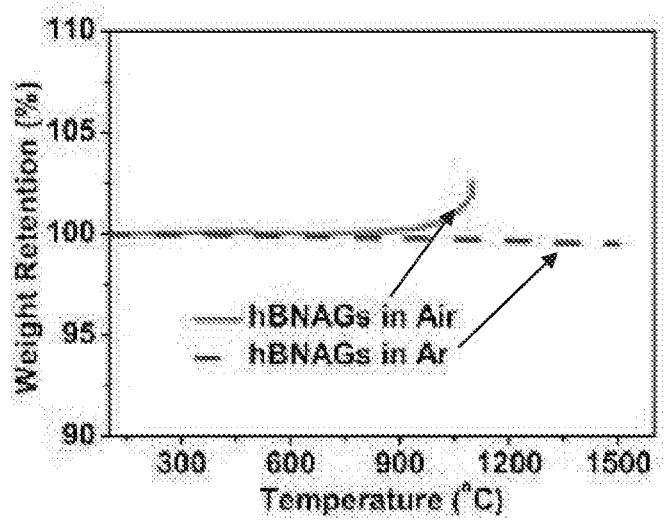
FIG. 36. Thermogravimetric analysis of hBNAGs in air and Ar.
Figure 37:
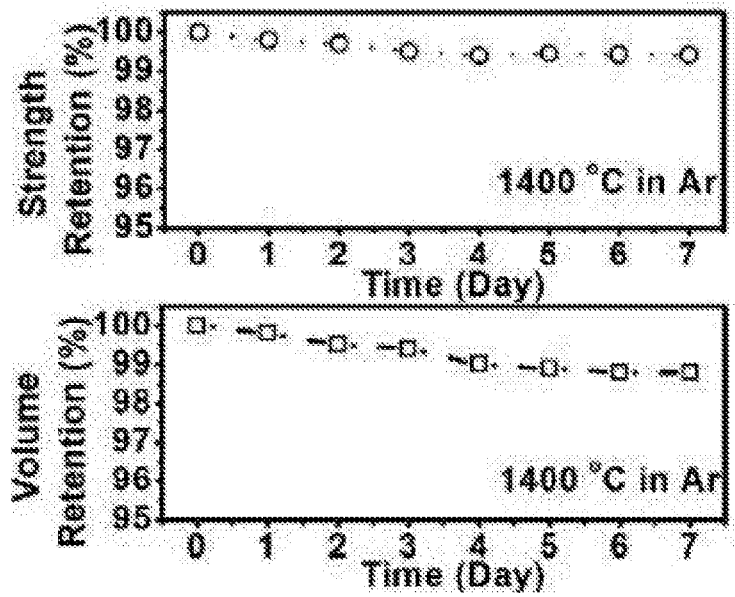
FIG. 37. Strength and volume variation of hBNAGs in long-term high temperature condition.

Evaluation is made of the effect of high temperature stress and no observable apparent weight loss occurred below about 900° C. in air and about 1500° C. in Ar from the thermogravimetric analysis (FIG. 36). The high crystallinity of the hBNAGs (FIG. 11) prevented the weight loss. Above about 900° C. in air oxidation induced formation of $B_2O_3$ layers is found, resulting in an increase in weight. The hBNAGs are kept at about 1400° C. for one week and no strength or volume loss is found (FIG. 37). In comparison, $SiO_2$, $Al_2O_3$, and BN aerogels all degraded under long-term, high-temperature conditions.

With excellent mechanical and thermal stability, the ultralight ceramic aerogels represent an attractive thermal insulation material family. In particular, the unusual double-paned pore structure suppresses air conduction and convection as well as reduces solid conduction contribution with its tortuous thermal pathway, leading to an ultralow thermal conductivity. For example, the resulting hBNAGs with a density of about 5 mg/cm³ exhibit a thermal conductivity (K) of about 2.4 mW/m K at room temperature in vacuum condition (pressure of about $10^{-5}$ Torr), which slightly increased to about 8.19 mW/m K at about 500° C. due to the increased thermal radiation (FIG. 4C, FIGS.

Figure 41:
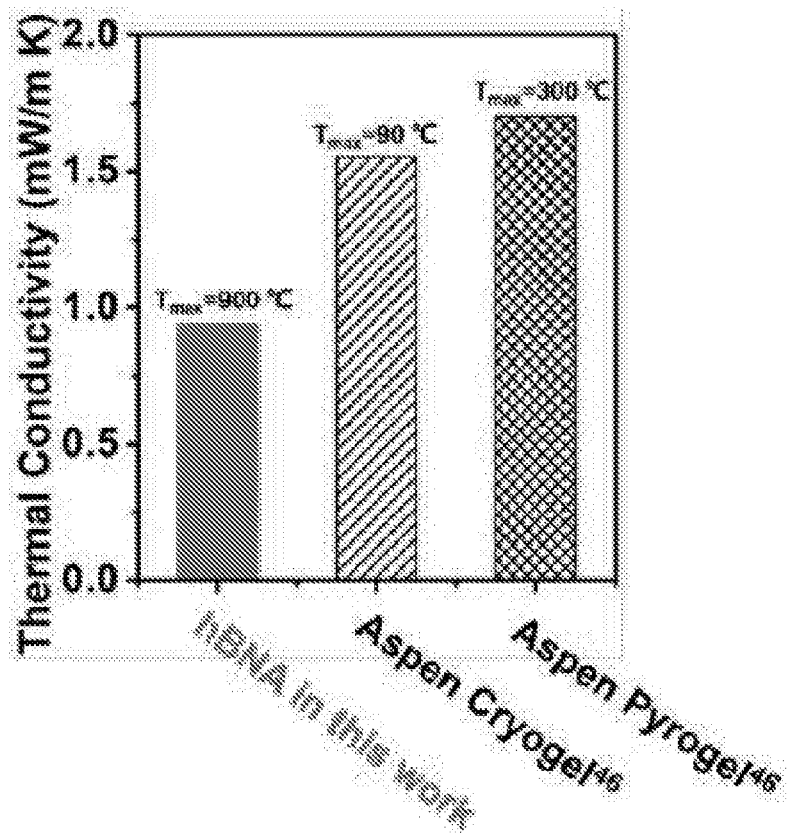
FIG. 41. The vacuum thermal conductivity of hBNAGs compared with commercial heat insulating coats. Comparison is made of hBNAGs with two super-thermal insulating coats (Pyrogel and Cryogel) from Aspen Aerogels, Inc. (NASA supplier) all under the same conditions (pressure of about 0.01 millitorr, hot side temperature of about 293 K, and cold side temperature of about 78 K). The thermal conductivity data of the commercial materials in vacuum is not available from the vendor, but has been reported in a NASA report for the aforementioned pressure and temperature range. Pyrogel and Cryogel's apparent thermal conductivities are about 1.7 mW/m K and about 1.55 mW/m K, respectively. For the same hot and cold side temperatures, which give $T_r$ of about 208 K, the thermal conductivity of the hBNAGs can be estimated using the fitting results shown in FIG. S36 to be about 0.94 mW/m K, lower than the reported value for Pyrogel and Cryogel, which are among the best heat insulating coats commercially available.

38-40, Table 1). In vacuum, the apparent thermal conductivity ($\kappa_{total}$) is the sum of radiation and solid conduction ($\kappa_{cond}$) contributions. Taking advantage of the different temperature dependence of thermal radiation and conduction, these two contributions are separated, and $\kappa_{cond}$ is estimated to be about 0.4 mW/m K, among the lowest for any freestanding material (FIG. 4D and FIG. 41). This low matrix thermal conduction is ascribed to three major factors, namely the ultralow density, the nanosized grains within the hBN sheets, and the double-paned wall structure. Naturally, density affects the actual conduction pathway and therefore $\kappa_{cond}$. However, because pristine multilayer hBN films have a high in-plane thermal conductivity of about 400 W/m K, the low density (about 0.2% volume fraction) alone cannot explain the low $\kappa_{cond}$. The in-plane thermal transport within each sheet in the hBNAGs is very much suppressed by phonon scattering at grain boundaries due to the small grain size (about 50-100 nm). For few-layer hBN, calculations indicate this effect can reduce $\kappa_{cond}$ by as much as 100 times from the pristine value. Moreover, the interfaces connecting adjacent pores (FIG. 4E) created additional thermal resistance. For graphene aerogels with solid walls, this interface is a van der Waals bond, while for the hBNAGs with double-paned structure, due to the presence of the interface gap (about 10 nm), heat transfer likely has to occur via near-field radiation (a much less effective process compared with van der Waals contact), and thus dramatically reducing $\kappa_{cond}$ beyond the reach of other aerogels.

Figure 46:
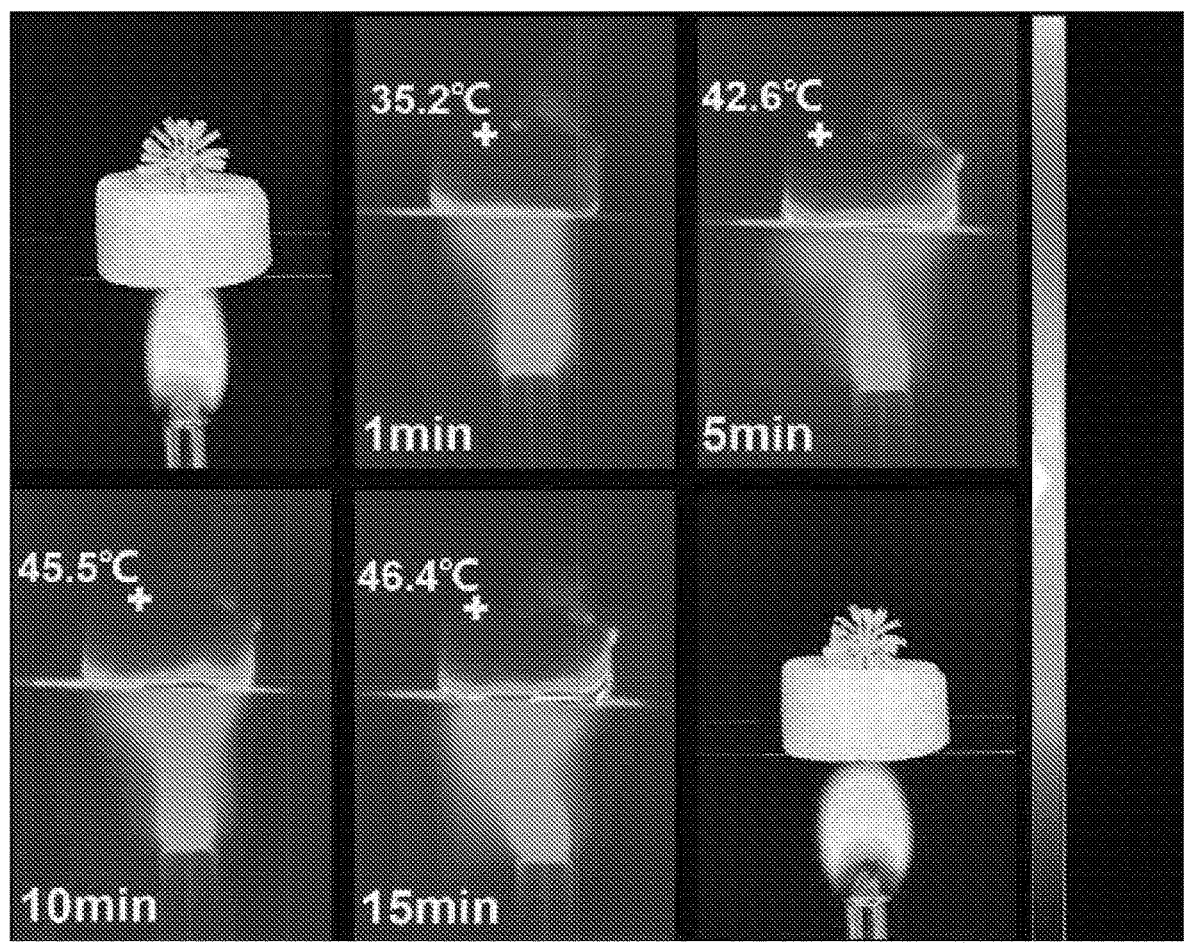
FIG. 46. Optical and IR images of hBNAGs on an alcohol flame with a fresh flower on its top for about 15 min. The sample was held by two thin iron wires. The flame itself (green) seems "colder" than the bottom of the sample (red) is due to the fire leaping and emissivity calibration of the IR camera.

Investigation is also made of the thermal conductivity at ambient condition (FIG. 4C and FIGS. 42-45). The hBNAGs with a density about 0.1 mg/cm³ exhibited $\kappa$ of about 24 mW/m K, similar to stationary air. The hBNAGs density is increased to about 10 mg/cm³, and the $\kappa$ decreased gradually to about 20 mW/m K due to the decreased pore size and the nanosized double-paned structures in the cell walls. This thermal superinsulating performance is better than stationary air. A 20-mm-thick hBNAG is placed directly on an alcohol flame (about 500° C.), and a fresh flower is placed on top of the plate (FIG. 46). The top surface of the hBNAG plate maintained a relatively low temperature of about 45° C. after being placed on the flame for 15 min, and the flower exhibited just slight withering.

The ceramic aerogels thus present a combination of low thermal conductivity and exceptional thermal stability, which provide considerable advantage for thermal superinsulation under extreme conditions (e.g., high temperature or sharp thermal shocks) (FIG. 4F), where polymeric and carbonaceous insulating materials could readily collapse or ignite, and other ceramic aerogels, such as $SiO_2$, $Al_2O_3$, SiC, and BN show rather poor mechanical stabilities.

Materials and Methods:

Synthesis of Ceramic Aerogels.

Ceramic aerogels were prepared through a template-assisted and catalyst-free CVD method. In a typical procedure for the fabrication of ceramic aerogel with a density of about 5 mg/cm³, a graphene aerogel (GA) template with a density about 5 mg/cm³ was first prepared by a modified hydrothermal reduction and non-contact freeze drying technique with a hyperbolic-porous structure, as described in X. Xu et al., Adv. Mater. 28, 9223 (2016) and Q. Zhang et al., Adv. Mater. 28, 2229 (2016), which are incorporated herein by reference. For the hBNAGs, borazine, the precursor, was synthesized by thermal decomposition of ammonia borane in tetraethylene glycol dimethyl ether under about 110° C. and about 50 mbar pressure, and collected in a trap under about −78° C. Then borazine in a custom-made bubbler below about −10° C. was introduced to the growth quartz chamber by Ar flow of about 10 sccm. When the pressure reached about 150 mbar, the valves at both ends of the chamber were closed to let borazine diffuse for about 1 h to realize a substantially uniform infiltration into the template. After that, the chamber was gradually heated in three stages: about 90° C. in about 1 h and maintained for about 1 h; about 500° C. in about 30 min and maintained for about 1 h; about 1500° C. in about 200 min and maintained for about 3 h. During the heating process, borazine firstly self-condensed into branched-chain or partially cross-linked polyborazylene, which further polymerized into amorphous BN coating on GA template via dehydrogenation at about 500° C. Upon further annealing at about 1500° C., the amorphous BN crystalized into the highly ordered hBN layers on GA. Lastly, the hybrid was annealed in air at about 600° C. to etch the graphene template to obtain the final hBNAGs.

For the βSiCAGs, hydridopolycarbosilane (CVD-4000, Starfire Systems Inc.) in a custom-made bubbler at room temperature was introduced to the growth quartz chamber by Ar flow of about 10 sccm. When the atmospheric pressure reached about 150 mbar, the valves at both ends of the chamber were closed to let the precursor diffuse for about 1 h to realize a substantially uniform infiltration into the template. After that, the chamber was gradually heated to about 800° C. in about 1 h and maintained for about 1 h; and about 1400° C. in about 120 min and maintained for about 1 h. After this growth stage, the hybrid was annealed in air at about 600° C. to etch the graphene template to obtain the final βSiCAGs.

$SiO_2$ aerogels and polyurethane (PU) foams were purchased from Aerogel Technologies, LLC, and General Plastics Manufacturing Company, respectively. $Al_2O_3$ and nickel aerogels were prepared by atomic layer deposition and sputter coating techniques respectively. Thermal insulating performances of commercial heat insulating coats were directly used from the vendors (Aspen Aerogels, Inc., ROCKWOOL UK, and Johns Manvilles).

Material Characterization.

The morphology was investigated by SEM, TEM, and AFM on ZEISS Supra 40VP, Titan Cubed Themis G2 300, and Bruker Dimension FastScan respectively. The elemental and structural analyses were carried out by X-ray photoelectron spectroscopy (XPS), X-Ray diffraction (XRD), Raman spectroscopy with Ar ion laser (about 633 nm), and Brunauer-Emmett-Teller (BET) on a PHI 5700 ESCA System, a Bruker D8 ADVANCE, a Horiba LabRAM, and an ASAP 2020 System respectively. The mechanical properties of ceramic aerogels were evaluated using an Instron 4505 universal testing machine with 100-N load cells at a strain rate of about 2 mm/min. The weights of the samples were measured by an ultra-micro balance of Mettler-Toledo XSE 105 with an accuracy of about 0.01 mg. The thermal shock tests of ceramic aerogel samples were carried on a custom-made pneumatic system with cold source from 0° C. to about −198° C. and hot source from about 25° C. to about 1100° C. The linear thermal expansion coefficient of ceramic aerogels was investigated by Thermal dilatometer (L75VD1600LT, Linses, German). The thermal thermogravimetric analysis was carried on the NETZSCH STA 449C. The thermal conductivity of the ceramic aerogels in vacuum was measured by a custom-made steady-state device (heater from about 25° C. to about 500° C. and chiller from about −20° C. to about 100° C.) in a vacuum chamber (pressure <about $10^{-3}$ Pa) and the thermal conductivity in air by a transient plane source system with Fluke Ti400 (about −20° C. to about 1200° C.) and Flir A655sc (about −50° C. to about 2000° C.) infrared thermal cameras on an optical platform with a copper rod integrated hot plate. The specific heat property of ceramic aerogels was tested by differential scanning calorimetry (DSC) on NETZSCH STA 449 C.

Supplementary Text:

Structure Design of Ceramic Aerogels.

Through finite element (FE) simulations, a 3D porous architecture is created with specially designed hierarchical microstructure, which presents the controllably regulating performance on mechanical deformation and thermal induced expansion with negative response index. In geometric morphologies, the 3D porous architecture is constructed by double-paned pore walls of nano/micro-sized sheets with micro-ripple morphologies as basic building elements. In detail, the basic hollow walls firstly form three different cells (quadrilateral, pentagon and hexagon), which then assembles into larger scale structures with re-entrant patterns. Due to the thermal induced out-of-plane vibration of nano/micro-sized hollow ripples, and combined with the oriented evolution of microstructure, this 3D porous architecture presents global negative Poisson's ratio (NPR) and negative thermal expansion coefficient (NTEC).

To simplify the simulation process in FE, the 2D geometric model was established as shown in FIG. 5, and the hollow characteristics of basic walls was simulated using beam element with hollow geometric parameter set as 1:1:1 for upper sheet thickness: interlayer hollow space: lower sheet. For NPR process, the deformation load was added with a displacement applied over the upper branch of about 10%, and the mode was fixed on the lower branch. The material attribute (density, Poison's ratio, Young's modulus) is set as the mono-crystal ceramics. The final obtained results of 3D porous architecture show significant NPR effect. The structure evolution reveals oriented deformation of designed re-entrant hyperbolic microstructure, which is the fundamental mechanism of NPR behavior. Such deformation characteristic in lateral corresponding to vertical compression optimizes the loading transferring pathway to make the tensile region decrease effectively, which can greatly improve the mechanical properties (ductility, fatigue resistance) of brittle ceramic aerogels.

For NTEC design, the temperature was gradually increased from 273 K to 473 K to investigate the thermal excited structural response. The material attributes are the same as the NPR simulation. The simulation is implemented to monitor the structural evolutions on different scales corresponding to individual hollow ripples (the upper layer: interlayer space: lower layer:plane width=1:1:1:200), basic assembled cells, and 3D porous architecture with designed re-entrant hyperbolic patterns the same as the NPR part. The calculated result for individual hollow ripple demonstrated that the more and smaller sized ripple structure evolved to the less and larger bubble like morphologies. This phenomenon implies the mechanism of thermal induced NTEC in micro-scale, even though the pure ceramic crystal usually has positive thermal expansion. Moreover, the assembled cell validated the structure changes of wall ripples to trigger the significant volume contraction of each porous cells. Furthermore, similar to the change of deformation behavior, this 3D porous architecture also presents global negative thermal expansion response, and the micro-elements that build the whole 3D structure showed apparent out-of-plane buckling, which is the fundamental reason resulting in the shortening of basic element and further shrinkage of global architecture.

Molecular Dynamics (MD) Simulations of Ceramic Aerogels.

In the MD simulations, simulation is made of the structure stability of hBN nano structure by relying on the empirical potential. Here, adoption is made of the Tersoff interaction which is able to describe $sp^2$ structures of BN to simulate the intra-layer interactions. The interlayer interactions between hBN sheets are described with potentials containing Coulombic and Lennard-Jones terms. All the simulations are carried out with the Large-scale Atomic/Molecular Massively Parallel Simulator (LAMMPS) code developed by Sandia National Laboratories.

The compression simulation of hBN nanoribbons with different layers (2, 8, and 32 layers) at a spacing of 3.32 Å. Each layer is built with a size of 175 Å×43 Å with armchair chirality composed of 2800 atoms. In the modeling of axial compression, the atoms are fixed at the two ends of the nanoribbon in longitudinal direction in which the uniaxial strain will be applied on. A periodic boundary condition (PBC) is applied along the width direction in plane. Before compression, each structure is relaxed through an energy minimization process. During the compression, the fixed parts were kept in the microcanonical (NVE) ensemble, while for the rest parts, the temperature was kept at 300 K in the canonical (NVT) ensemble. The compression rate was kept at $1.25×10^9$/s, and the maximum compressive strain is set to be 0.5 except the 32-layer nanoribbon since it will break at a compressive strain of 0.33. The nanolayered superelasticity of hBNAGs can be demonstrated by the simulation results of the 2-layer and 8-layer model, while the breakage of B—N covalent bond and induced crack in the 32-layer model can provide an evidence for the brittle nature in bulk hBN. However, in the experiments, the samples with cell wall thickness above 40 nm start to exhibit brittle behavior, while the crack in 32-layer model should be attributed to the size effect in the MD simulation.

For thermal response evaluation, the hBN pore structure is built by four perpendicular aligned walls of hBN nanoribbons. The blue and ochre atoms represent nitrogen and boron atoms, respectively. Each wall contains two parallel hBN nanoribbon with a spacing of 16.6 Å to represent the hollow structure after removing graphene template. And the length and width of nanoribbon is of about 500 and 40 Å, respectively. The dimension of the pore model is 747 Å×43 Å×741 Å which is composed 64000 atoms in total. The y axis of the system was under a PBC to mitigate the boundary effect. The velocity-Verlet integration methodology is adopted to solve the equations of motion with a time step of 1 fs. During the whole simulation, the motions of both ends of each wall (about 20 Å) have been constrained in one axis (e.g. the motion in the y direction of the four ends in the horizontal way is constrained) in order to keep the pore structure from spreading. The constrained parts were always relaxed in the microcanonical (NVE) ensemble while the unconstrained parts were firstly relaxed in the canonical (NVT) ensemble at 300 K for 1 ns. Then the temperature was gradually increased to 1800 K at a rate of 14 K/ps and kept at 1800 K for 0.5 ns. The shape of pore structure remains in quadrilateral at 300 K; however, when the temperature increases some ripples began to form in the nanoribbon and the pore size began to shrink.

Thermal Measurements of Ceramic Aerogels in Vacuum.

Figure 38:
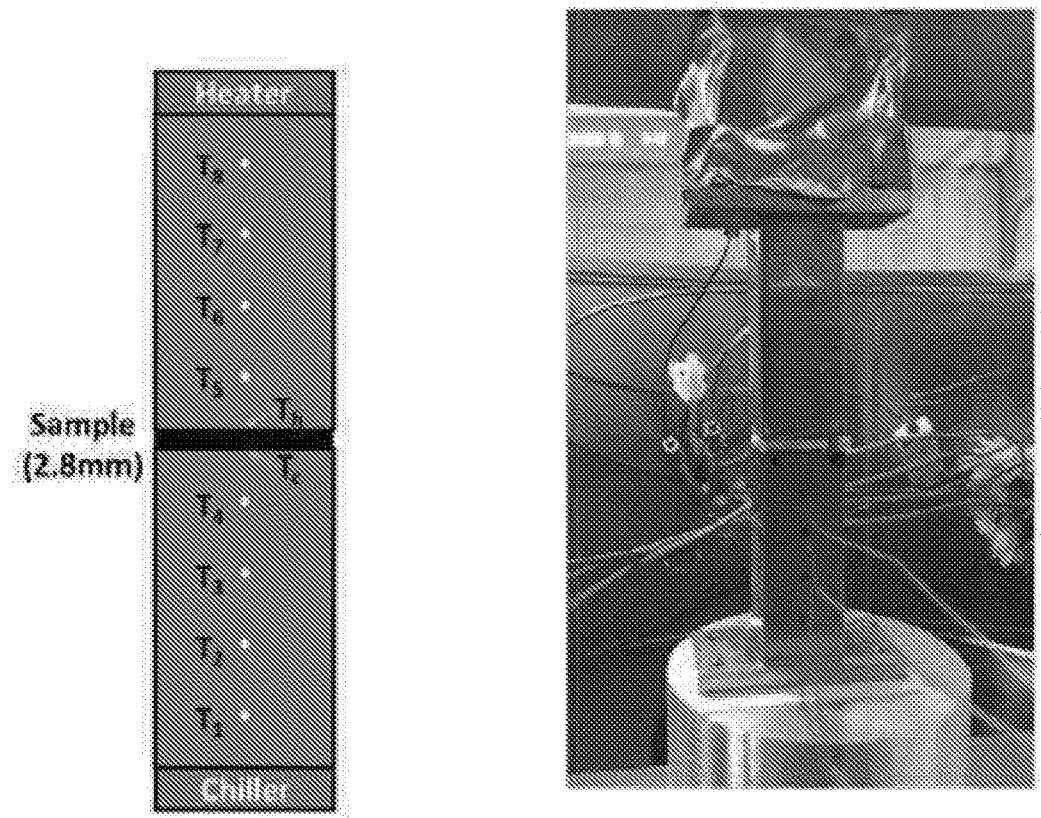
FIG. 38. Reference bar method for measuring material thermal conductivity in vacuum. Left: reference bar setup schematic. Right: reference bar setup photo. The sample is sandwiched between two stainless steel bars of size of about 2 cm×2 cm×5 cm. Each bar has four K type thermocouples inserted for measuring its temperature profile. Heat is supplied from the top by a resistance heater and flows downwards through the bars and the sample. The whole setup sits inside a bell jar and is in high vacuum (better than about $10^{-5}$ Torr) during measurements. Thermocouple readings are collected by a 20-channel digital multimeter (Keithley 2700), controlled by a LabVIEW program.

For the measurement of material thermal conductivity in vacuum, a test rig modified from the ASTM-5470 "reference bar" standard is used, as shown in FIG. 38. Two stainless steel (SS304) reference bars are used. The temperature profiles along the bars, T(z), are measured using K type thermocouples (calibrated to ±5 mK) and the SS thermal conductivity, $\kappa_{SS}$, is well documented from literature (temperature dependent $\kappa_{SS}$ is used). In the strict one-dimensional case, at steady state, the heat flux through the bars can be calculated using Fourier's law $$q = \kappa_{SS} \cdot \frac{dT}{dz}. \quad (1)$$

This form neglects radiation heat losses from the surface of the bar, which are discussed further below. The temperatures at the upper ($T_h$) and lower ($T_c$) surfaces of the sample are also readily obtained by linear extrapolation of the bar temperatures. The thermal conductivity of the sample is then $$\kappa_{hBNA} = q \cdot t/(T_h - T_c) \quad (2)$$

with t being the thickness of the sample (about 2.8 mm).

For very high thermal resistances such as that of the present hBNAGs, the vertical conduction heat flux is very low, and the radiation losses from the upper reference bar sidewalls become significant or even dominating. Therefore, using q on the lower bar for Eq. 2 gives more accurate results. In this evaluation, however, since the hBNAG thermal conductivity is very low, the radiation losses from the lower bar are still not negligible, which introduces additional error in the q if direct use is made of Eq. 1. Furthermore, despite the effort to fabricate thin samples (thickness of about 2.8 mm compared with the lateral dimension of about 20 mm) to minimize radiation losses from the sample sidewalls, such lateral losses may still not be totally negligible. Here, as a refined treatment to further reduce measurement error, COMSOL simulation is used to evaluate the sample thermal conductivity, taking into account these non-idealities due to radiation.

Figure 39:
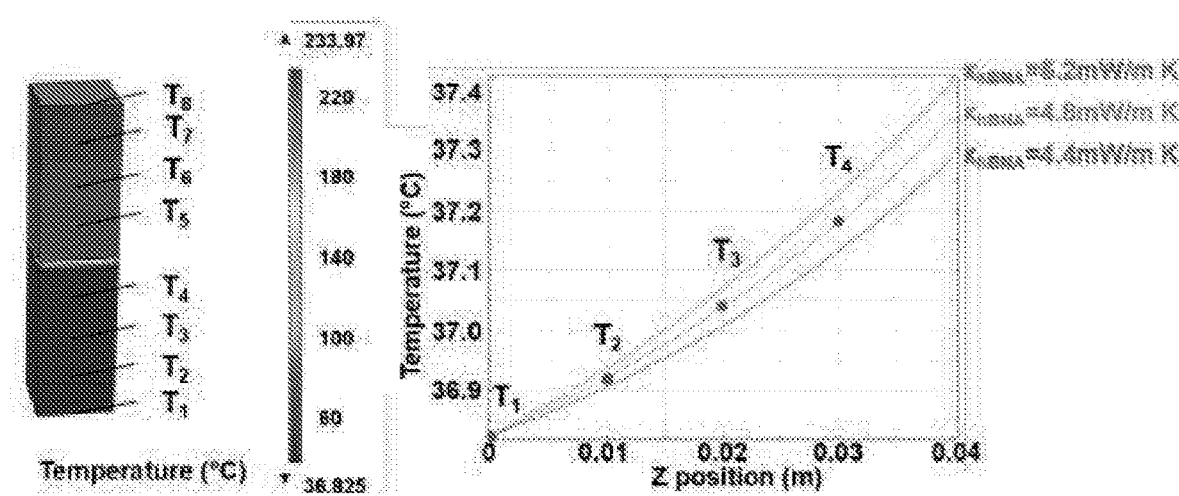
FIG. 39. COMSOL simulations of Reference bar method for measuring material thermal conductivity in vacuum. Left: example temperature contour plots of the heated column including two bars and the hBNAG sample in between (corresponding to the 5th data point on FIG. 4C). Right: fitting of experimental data with COMSOL simulation results shown on the left panel. The curve shows temperature of an imaginary vertical line connecting the thermocouples' tip points, which are about 5 mm deep into the surface. Simulation results assuming about 10% variation in $\kappa_{total}$ show good measurement sensitivity.

The procedure to evaluate $\kappa_{total}$ with the help of COMSOL simulation is described in the following. A simulation domain as shown in FIG. S35 (left panel) is used. The bar and the sample sidewalls are radiating to the ambient (blackbody at room temperature) with emissivity of 0.20 and 0.74 (determined with infrared (IR) camera calibration), respectively. Temperature $T_1$ and $T_8$ are given by the experimentally measured value. $\kappa_{total}$, which is the sole free parameter, is given a guessed value and then iterated until the best fit is achieved between experimental and simulation temperature profile on the lower bar (namely, $T_2$-$T_4$, as shown in the FIG. 39, right panel). Fitting sensitivity shows very low uncertainty introduced by the fitting process. In addition, about 10% uncertainty in $\varepsilon_{bar}$ and $\varepsilon_{hBNA}$ lead to about 3% and about 1% uncertainty in $\kappa_{total}$, respectively. Considering these factors and geometric uncertainty, the total measurement uncertainty in $\kappa_{total}$ is estimated to be about 10%. Compared with these results (evaluated with the help of COMSOL), ignoring radiation losses and directly using Eqs. 1 and 2 leads to underestimation of $\kappa_{total}$ by about 40-50%.

Setup Validation Using a No-Sample Condition:

Validation is made of this experimental setup by measuring a no-sample condition, where the sole heat transfer mode is the radiation between the two bar surfaces (electroplated with Cu and polished to 1500 grit) separated by an empty gap less than about 0.5 mm thick. Because this t is small compared to the bar cross section (w=about 20 mm), this geometry is modeled as parallel plates which gives the result $$q = \frac{\sigma(T_h^4 - T_c^4)}{\frac{1-\varepsilon}{\varepsilon} + 1 + \frac{1-\varepsilon}{\varepsilon}} \quad (3)$$

where $\sigma = 5.67 \times 10^{-8}$ W/m² K⁴ is the Stefan-Boltzmann constant and $\varepsilon$ is the surface emissivity of the electroplated Cu. Evaluating q, $T_h$, and $T_c$ as described above, $\varepsilon$ from Eq. 3 is experimentally determined to be about 0.13. To validate this, direct measurement is made of the emissivity of another SS surface that went through the same Cu electroplating and polishing procedure using optical (reflection-mode FTIR) methods. The surface is slightly non-gray, namely the emissivity is weakly frequency dependent. Averaging the FTIR-determined spectral emissivity as weighted by the Planck distribution at about 300 to about 400 K, the emissivity is between about 0.11 and about 0.12 at the temperature used for this validation experiment. Hence, it is concluded that the present setup has the adequate precision to measure thermal conductivity in the range of interest.

Estimation of Radiation and Solid Contribution to the Total Thermal Conductivity:

For such highly porous materials like the hBN, both the radiation and solid conduction can make significant contributions to the total thermal conductivity. Estimation can be made of their separate contributions by taking advantage that $\kappa_{rad}$ and $\kappa_{cond}$ have very different temperature dependencies. Specifically, assuming temperature-independent radiative material properties (absorption and scattering coefficients) inside the hBN, then $\kappa_{rad}$ is proportional to $T_{rad}^3$, where $$T_{rad}^3 = \frac{1}{4} \times (T_h^2 + T_c^2)(T_h + T_c).$$

Figure 40:
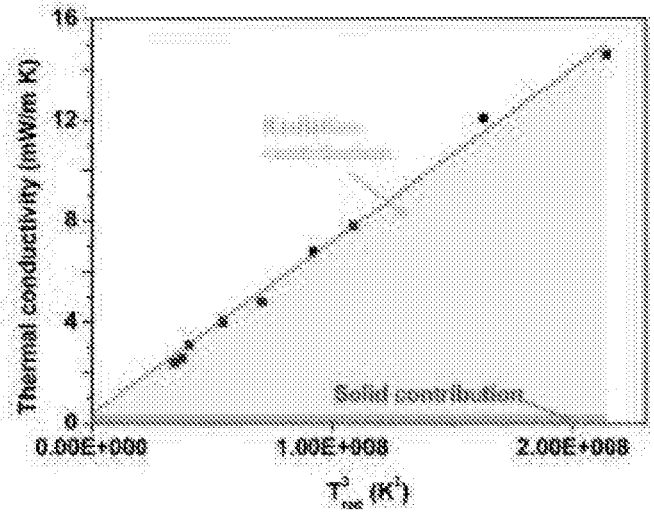
FIG. 40. Replot of thermal conductivity measurement results against $T_{rad}^3$. Radiation and solid conduction contributions to the total thermal conductivity can be separated by performing a linear fitting of the data on this plot.

In contrast, $\kappa_{cond}$ of hBN is a weak function of temperature (slowly decreasing) above about 300 K, which is reasonably approximated as independent of $T_{rad}^3$. Accordingly, the total thermal conductivity measurement results for various temperatures from FIG. 4C are replotted here in FIG. 40 as a function of $T_{rad}^3$. The solid conduction contribution is approximated by performing a linear least-square fit (with residuals weighted by the spacing between adjacent points along the x axis of FIG. 38) and taking the intercept. Statistical analysis shows good linearity with an $R^2$ value of 0.99. Therefore, $\kappa_{cond}$ is estimated to be 0.4±0.4 mW/m K (mean±stdev). It is concluded that $\kappa_{rad}$ is the major contribution at all the temperatures tested.

Thermal Measurements of Ceramic Aerogels in Air.

The thermal diffusivity of insulating materials is typically measured by one or more of several methods, including transient plane source, laser flash or 3-omega. In this example, the sample is highly porous hBNAGs with a roughly cuboidal overall shape. For the transient plane source (TPS) method, the sensor is typically sandwiched by two identical samples. Considering the weight and shape of the sample here, robust symmetric contact with the sensor would be difficult to achieve in practice. As for the laser flash and 3-omega methods, they typically perform well for thin samples (thicknesses <about 100 μm) and are therefore not suitable for the present sample.

In this example, a variant of the TPS method is used in which the sample is suddenly but gently lowered onto a copper surface with substantially constant temperature. The sudden contact with the copper surface simulates the process of applying constant temperature to the bottom of the sample. Upon contacting the copper surface, heat flows vertically from the copper plate to the sample; therefore, heat conduction is reasonably approximated as 1D. Moreover, considering a very short time period in which thermal penetration depth is much less than the dimension of the sample, the sample size can be treated as infinite. Therefore, in this example, semi-infinite 1D transient conduction theory is applied to determine thermal diffusivity $\alpha$.

Theory:

For transient conduction into a semi-infinite plane with a constant surface temperature and a uniform-temperature initial condition, the temperature at distance x from the surface and time t is given by:

$$\frac{T(x,t) - T_s}{T_i - T_s} = \text{erf}\left(\frac{x}{2\sqrt{\alpha t}}\right) \quad (4)$$

where $T_i$ is the initial temperature of the sample, $T_S$ is the temperature of the hot copper surface, $\alpha$ is the thermal diffusivity, t is time, and x is the distance from the hot copper surface. In practice, a plane wall of a thickness 2 L can be accurately approximated as a semi-infinite solid if:

$$Fo = \alpha t/L^2 \leq 0.2 \quad (5)$$

Because the length of the sample is finite, to satisfy the semi-infinite assumption the model is valid up to $t < t_{max} = 2$ s; this assumption is checked for validity according to the calculated $\alpha$ value.

Experimental Setup:

A large square copper plate was heated by a hot plate, and a copper bar was attached to the square copper plate with thermal paste. The remainder of the square copper plate was covered with styrofoam to impede heat flow to the surrounding air underneath the sample. The top surface of the copper bar was the source of constant temperature $T_S$ in Eq. 4, and its temperature was recorded by a thermocouple reader (Omega™ CL3515R). The ambient air temperature around the sample was measured by a thermocouple reader (Omega™ CL3515R). The sample was left in the air for at least about 2 min to reach the temperature of ambient air, which serves as $T_i$ in Eq. 5. In this example, constant temperature was applied to the bottom of the sample by quickly lowering it to a hot copper surface. Because the sample was very light, it did not fall by its own weight; therefore, a holder was designed to guide the sample to drop to the hot copper surface. The sample holder was made of styrofoam with similar thermal properties as the hBNAGs to minimize heat transfer between the sample and the sample holder. The sample holder was inserted into a vertical guiding slot to fall (FIGS. 42a and b). The sample holder was designed such that the bottom surface of the sample remained substantially parallel to the copper surface during the descent to achieve good face-to-face contact (FIG. 42b), at t=0 in Eq. 5. Because the thermal mass of the copper bar was much greater than that of the sample, changes in the copper temperature as measured by the thermistor were imperceptible. The average of the thermistor reading during the experiment was used as $T_S$ in Eq. 5.

Figure 42:
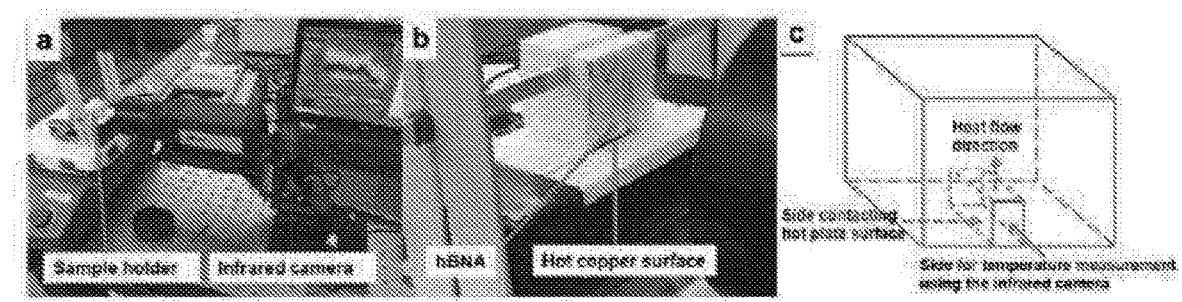
FIG. 42. Experimental setup for the semi-infinite plane transient heat conduction. (a) The hBNAG is fixed in the middle of the sample holder, and the sample is lowered gently to the copper surface via a slot. The sample's vertical temperature profile was recorded using an infrared camera mounted on a X-Y-Z linear stage to ensure perpendicularity. (b) hBNAG sample within the sample holder. (c) Illustration of different sides of sample when it touches the copper surface, faces the infrared camera, as well as the direction of heat flow.
Figure 43:
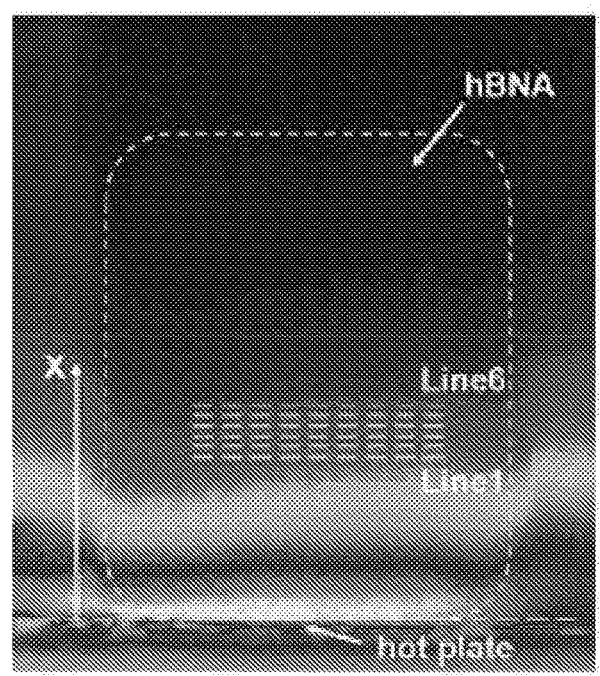
FIG. 43. Thermal measurement of the hBNAG sample by IR imaging. Six evenly spaced lines indicate locations where temperature is measured. The average temperature of an individual line is obtained by averaging the temperature at all pixels along that line.

Prior to the experiment, the radiative emissivity of the sample was calibrated by heating it to a known temperature measured by the thermistor. Because the heat conduction process was 1D (see FIG. 42c) in the x direction, temperature was assumed to be identical in the plane perpendicular to the x direction. Therefore, temperature on the side of the sample was treated as the sample temperature at different x and was detected using an IR camera (Flir A655sc) with a close-up lens (about 25 μm resolution) as shown in FIG. 42.

In the thermal image, different lines on the sample's side surface indicate different distances from the hot copper surface, and the average temperature of all pixels along each line was treated as the temperature at location x.

Uncertainty Quantification:

Given the temperature measurement results and corresponding mathematical model (Eq. 4), an approach to determine thermal diffusivity $\alpha$ is non-linear regression, such as Levenberg-Marquardt method. Such an approach gives a best estimate of a but does not estimate the probability distribution for a and does not consider uncertainties in other parameters (such as $T_i$, $T_S$, x). Bayesian inference incorporates prior distributions and likelihoods to give a complete statistical description of the unknown parameters based on Bayes' formula:

$$P(\theta|Y) = \frac{p(Y|\theta)p(\theta)}{p(Y)} \quad (6)$$

where $\theta$ is the unknown random variable and Y is the observed data. The marginal probability distribution function $p(\theta)$ is the prior, which reflects prior knowledge of the parameter before experiment. The likelihood function is $p(Y|\theta)$, and the posterior probability density function (PPDF) of $\theta$ after observing measurement data Y is $p(\theta|Y)$. $\theta$ is typically estimated using an estimator such as the posterior mean, and the uncertainty of $\theta$ is determined by sampling the PPDF $p(\theta|Y)$.

In this example, according to Eq. 4, $\theta = \{\alpha, T_i, T_S, x\}$. The first stage is to assign a prior distribution for all elements in $\theta$. Before the experiment, prior knowledge was prescribed that the thermal conductivity of hBNAGs were comparable to air, and the order of magnitude of thermal diffusivity $\alpha$ was estimated using:

$$\alpha = k/(\rho \cdot C_p) \quad (7)$$

where k is thermal conductivity, $\rho$ is mass density and $C_p$ is the specific heat of hBNAGs. According to Eq. 6, $\alpha$ was estimated to be of the order of magnitude of $10^{-6}$ m$^2$/s. A much wider uniform distribution ($10^{-8}$ m$^2$/s, $10^{-4}$ m$^2$/s) that covered $10^{-6}$ m$^2$/s was used as the prior distribution for $\alpha$. For $T_i$ and $T_S$, because they were obtained using a thermocouple reader (Omega™ CL3515R) that was accurate up to about 0.5 K, the prior distribution for $T_i$ and $T_S$ were taken as uniform distribution within ($T_i$−0.5 K, $T_i$+0.5 K) and ($T_S$−0.5 K, $T_S$+0.5 K) respectively. Temperature was measured at six evenly spaced locations (x) on the sample, indicated by six evenly spaced lines in FIG. S39. The location for line i is:

$$x_i = \text{offset} + i \times 5 \text{ pixels} \quad (8)$$

where offset is the distance between the hot plate surface and the nearest line (line 0); five pixels represents the space between neighboring locations; and i={0,1,2,3,4,5} indicates the index of a given line. Because the boundary of the hot plate was not perfectly clear, an uncertainty of 3 pixels was assigned to offset. The software of the IR camera can accurately obtain temperature along evenly spaced lines; therefore, no uncertainty was assigned to the space between neighboring lines. According to Eq. 8, the prior distribution of the location of line i is a uniform distribution within (offset+5 pixels×i−3 pixels, offset+5 pixels×i+3 pixels).

The second stage is to build the likelihood $p(Y|\theta)$. In this example, the measured temperature was assumed to be Gaussian with mean $T(\theta)$ and standard deviation VT Therefore, $p(Y|\theta)$ is specified as:

$$p(Y \mid \theta) \propto \exp\left\{-\frac{((Y - T(\theta))^T(Y - T(\theta))}{2v_T}\right\} \quad (9)$$

Figure 44:
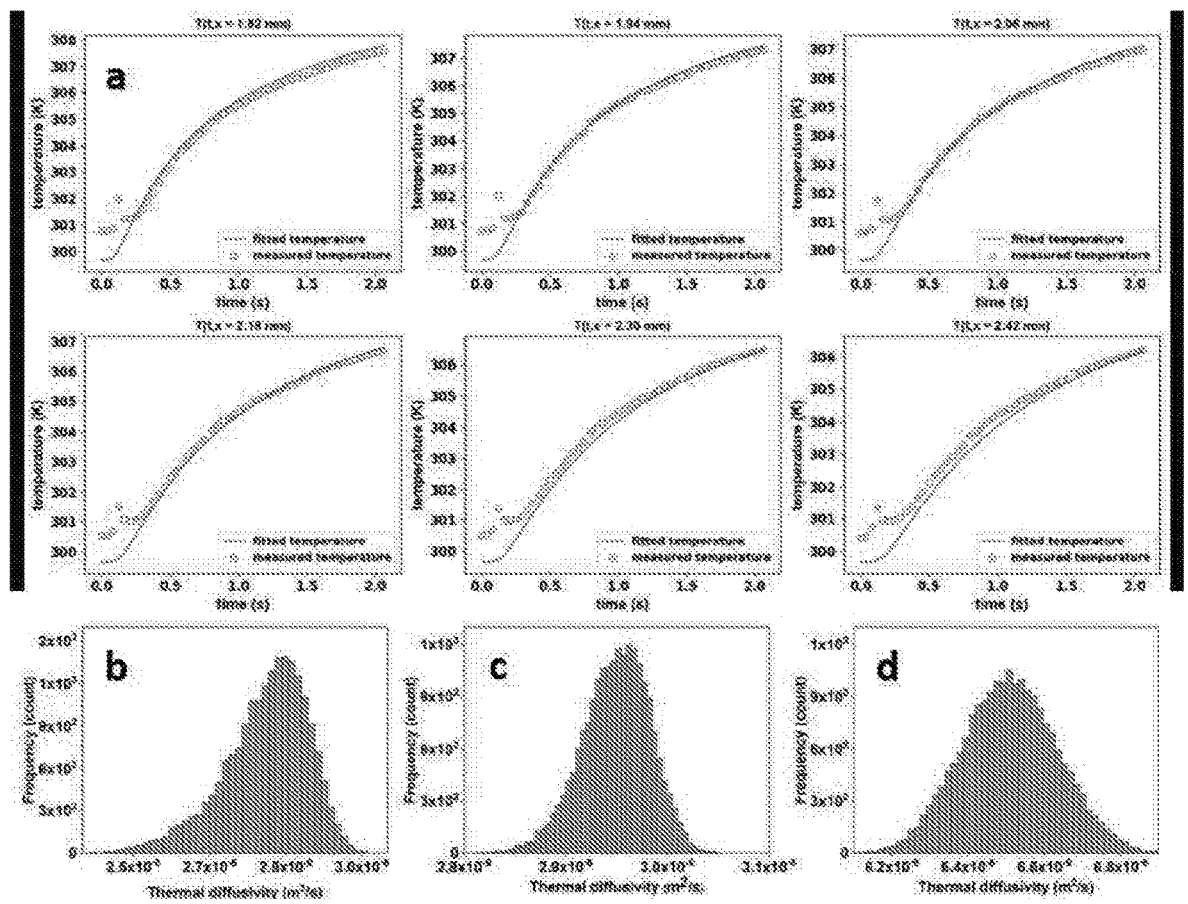
FIG. 44. Fitting for thermal diffusivity at 6 different locations of one measurement. (a) Measured temperature at six evenly spaced locations on about 10.1 mg/cm$^3$ hBNAG (red open circles) and temperature calculated using Eq. 4 and posterior mean estimation of thermal diffusivity (solid blue line). (b) Posterior probability density function of thermal diffusivity for one measurement. (c-d) Posterior probability density function of mean thermal diffusivity α bar (combines PPDFs of 5 measurements) for hBNAGs of about 10.1 mg/cm$^3$ and about 5.2 mg/cm$^3$.
Figure 45:
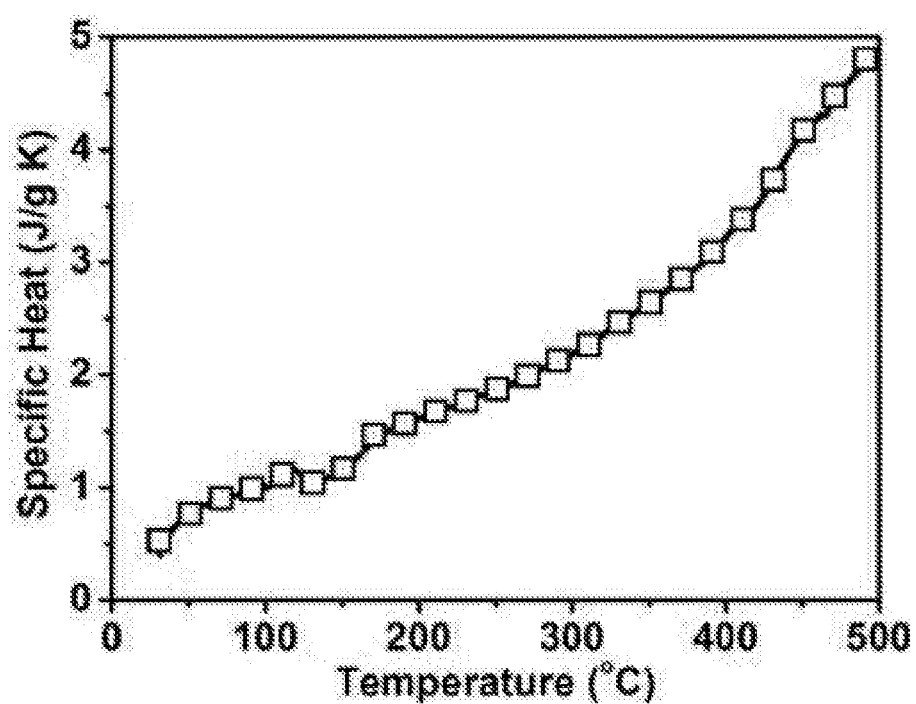
FIG. 45. Specific heat measurement of hBNAGs from DSC.

The third stage involves combining the prior and likelihood using Eq. 6 to obtain the PPDF for thermal diffusivity. In this example, the PYMC3 python module was used for the posterior mean estimation and sampling PPDF. For each measurement, α was estimated using the posterior mean according to the temperature profile at all six locations ($x_i$) on the sample, and the PPDF of α was obtained from numerical sampling. The temperature measurement result, posterior mean and PPDF of α for one measurement is shown in FIG. 44. For each hBNAG sample, the temperature measurement was repeated five times. Each measurement gives a posterior mean as well as a PPDF for α. Five PPDFs were combined to derive the mean thermal diffusivity using:

$$\bar{\alpha} = \frac{1}{5}\sum_{i=1}^{5} \alpha_i \quad (10)$$

where
$\bar{\alpha}$ is the mean thermal diffusivity, and $\alpha_i$ indicates a random sample drawn from the ith PPDF.

In this example, thermal diffusivities of hBNAGs of different densities were measured. For example, using the foregoing Bayesian inference approach, mean thermal diffusivities for about 5.2 mg/cm³ samples were about 6.50× $10^{-6}$ m²/s, and the probability distribution of corresponding mean thermal diffusivity is shown in FIG. S40. According to the probability distribution, the 95% confidence interval for mean thermal diffusivities for about 5.2 mg/cm³ samples were (about 6.27×$10^{-6}$ m²/s to about 6.75×$10^{-6}$ m²/s). Because the experiment was performed at about 40.1° C. according to FIG. 45, the specific heat of hBNAG is about 630 J/(kg K). Using Eq. 7, thermal conductivities for the hBNAG of about 5.2 mg/cm³ are 21.3±0.8 mW/m K.

TABLE 1

Raw temperature data and evaluation results for the $\kappa_{total}$ measurement in vacuum.

| $T_1$ (° C.) | $T_2$ (° C.) | $T_3$ (° C.) | $T_4$ (° C.) | $T_5$ (° C.) | $T_6$ (° C.) | $T_7$ (° C.) | $T_8$ (° C.) | $\kappa_{total}$ (mW/m K) |
|---|---|---|---|---|---|---|---|---|
| 24.93 | 24.95 | 24.96 | 24.98 | 77.95  | 78.13  | 78.53  | 78.95  | 2.4  |
| 25.77 | 25.80 | 25.81 | 25.84 | 95.76  | 96.03  | 96.59  | 97.21  | 2.55 |
| 28.70 | 28.71 | 28.75 | 28.77 | 109.15 | 109.96 | 109.97 | 110.61 | 3.1  |
| 30.93 | 30.99 | 31.09 | 31.16 | 173.00 | 174.56 | 174.60 | 176.21 | 4.0  |
| 36.83 | 36.92 | 37.04 | 37.18 | 228.58 | 230.82 | 231.12 | 233.97 | 4.8  |
| 44.55 | 44.74 | 44.99 | 45.23 | 290.09 | 293.32 | 294.15 | 298.89 | 6.8  |
| 50.23 | 50.48 | 50.78 | 51.11 | 330.48 | 334.22 | 335.81 | 342.05 | 7.8  |
| 82.19 | 82.63 | 83.10 | 83.63 | 426.29 | 430.58 | 435.45 | 447.11 | 12.1 |
| 95.37 | 96.06 | 96.80 | 97.58 | 505.67 | 511.58 | 522.16 | 539.74 | 14.6 |

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is spherical or spheroidal can refer to a diameter of the object. In the case of an object that is non-spherical or non-spheroidal, a size of the object can refer to a diameter of a corresponding spherical or spheroidal object, where the corresponding spherical or spheroidal object exhibits or has a particular set of derivable or measurable properties that are substantially the same as those of the non-spherical or non-spheroidal object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "nanostructure" refers to an object that has at least one dimension in a range of about 1 nm to about 1000 nm. A nanostructure can have any of a wide variety of shapes, and can be formed of a wide variety of materials. Examples of nano structures include nanofibers, nano sheets, and nanoparticles.

As used herein, the term "nanoparticle" refers to a nanostructure that is generally or substantially spherical or spheroidal. Typically, each dimension of a nanoparticle is in a range of about 1 nm to about 1000 nm, and the nanoparticle has an aspect ratio of about 5 or less, such as about 3 or less, about 2 or less, or about 1.

As used herein, the term "nanofiber" refers to an elongated nanostructure. Typically, a nanofiber has a lateral dimension (e.g., a width) in a range of about 1 nm to about 1000 nm, a longitudinal dimension (e.g., a length) in a range of about 1 nm to about 1000 nm or greater than about 1000 nm, and an aspect ratio that is greater than about 5, such as about 10 or greater.

As used herein, the term "nanosheet" refers to a planar-like, nanostructure.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A ceramic aerogel comprising a porous framework including interconnected double-paned wall structures of a ceramic material, wherein each double-paned wall structure includes a pair of walls spaced apart by a gap;
    wherein the gap between the pair of walls is from 1 nm to 50 nm.

2. The ceramic aerogel of claim 1, wherein the porous framework is hyperbolic structured.

3. The ceramic aerogel of claim 1, wherein the interconnected double-paned wall structures define pores within the porous framework.

4. The ceramic aerogel of claim 1, wherein the ceramic material is a metal, non-metal, or metalloid nitride.

5. The ceramic aerogel of claim 1, wherein the ceramic material is hexagonal boron nitride.

6. The ceramic aerogel of claim 1, wherein the ceramic material is a metal, non-metal, or metalloid carbide.

7. The ceramic aerogel of claim 1, wherein the ceramic material is β silicon carbide.

8. The ceramic aerogel of claim 1, wherein the ceramic material is a metal, non-metal, or metalloid oxide.

9. The ceramic aerogel of claim 1, wherein the ceramic material is a metal, non-metal, or metalloid silicate.

10. The ceramic aerogel of claim 1, wherein each of the pair of walls has a thickness in a range of 1 nm to 150 nm.

11. The ceramic aerogel of claim 1, wherein each of the pair of walls includes one or more layers of the ceramic material.

12. The ceramic aerogel of claim 1, having a negative Poisson's ratio.

13. The ceramic aerogel of claim 1, having a negative linear thermal expansion coefficient.

14. The ceramic aerogel of claim 1, having a density of 50 $mg/cm^3$ or less.

15. The ceramic aerogel of claim 1, having a maximum elastic strain of 50% or greater.

16. The ceramic aerogel of claim 1, having a porosity of 70% or greater.

17. The ceramic aerogel of claim 1, having a specific surface area of 800 $m^2/g$ or greater.

18. The ceramic aerogel of claim 1, having a thermal conductivity in vacuum of 15 mW/m K or less.

19. The ceramic aerogel of claim 1, having a thermal conductivity in air of 50 mW/m K or less.

20. A method of forming a ceramic aerogel, comprising:
    providing a template, wherein the template is an aerogel of a template material;
    depositing a ceramic material on and within the template; and
    removing the template material to form the ceramic aerogel having a double-paned wall structure including a pair of walls spaced apart by a gap;
    wherein the gap between the pair of walls is from 1 nm to 50 nm.

21. The method of claim 20, wherein the template material is a carbonaceous material.

22. The method of claim 20, wherein the template material is graphene.

23. The method of claim 20, wherein depositing the ceramic material is performed by chemical vapor deposition.

24. A ceramic aerogel comprising a fibrous framework and interconnected nanosheets of a ceramic material covering the fibrous framework;
    wherein the interconnected nanosheets have a double-paned wall structure including a pair of walls spaced apart by a gap;
    wherein the gap between the pair of walls is from 1 nm to 50 nm.

25. A method of forming a ceramic aerogel, comprising:
    providing a template, wherein the template is a fibrous framework; and
    depositing a ceramic material on and within the template to form interconnected nanosheets of the ceramic material covering the fibrous framework;
    wherein the interconnected nanosheets have a double-paned wall structure including a pair of walls spaced apart by a gap; and
    wherein the gap between the pair of walls is from 1 nm to 50 nm.

* * * * *